(12) United States Patent
Bender et al.

(10) Patent No.: US 12,718,175 B2
(45) Date of Patent: Aug. 25, 2026

(54) COMPUTER-IMPLEMENTED METHOD, SYSTEM AND COMPUTER PROGRAM FOR PROVIDING AUDIT RECORDS THAT RELATE TO TECHNICAL EQUIPMENT

(71) Applicant: BASF SE, Ludwigshafen (DE)

(72) Inventors: Laura Bender, Lampertheim (DE); Heike Brueser, Lampertheim (DE); Dominik Odenbach, Lampertheim (DE); Martin Stahljans, Lampertheim (DE)

(73) Assignee: BASF SE, Ludwigshafen (DE)

( * ) Notice: Subject to any disclaimer, the term of this patent is extended or adjusted under 35 U.S.C. 154(b) by 740 days.

(21) Appl. No.: 17/422,273

(22) PCT Filed: Jan. 9, 2020

(86) PCT No.: PCT/EP2020/050454
§ 371 (c)(1),
(2) Date: Jul. 12, 2021

(87) PCT Pub. No.: WO2020/148158
PCT Pub. Date: Jul. 23, 2020

(65) Prior Publication Data

US 2022/0092511 A1 Mar. 24, 2022

(30) Foreign Application Priority Data

Jan. 17, 2019 (EP) .................................... 19152423

(51) Int. Cl.
*G06Q 10/0639* (2023.01)
*G06Q 10/0631* (2023.01)
*G06V 40/16* (2022.01)

(52) U.S. Cl.
CPC ................ *G06Q 10/06395* (2013.01); *G06Q 10/063114* (2013.01); *G06V 40/161* (2022.01); *G06V 40/172* (2022.01)

(58) Field of Classification Search
CPC ..... G06Q 10/06395; G06Q 10/063114; G06V 40/161; G06V 40/172
See application file for complete search history.

(56) References Cited

U.S. PATENT DOCUMENTS 2,247,068 A 6/1941 Richter
2005/0010808 A1 1/2005 Wixson et al.
(Continued)

FOREIGN PATENT DOCUMENTS

CN 102177524 A 9/2011
CN 108885446 A 11/2018
(Continued)

OTHER PUBLICATIONS

B. Meden et al., "Privacy-Enhancing Face Biometrics: A Comprehensive Survey," in IEEE Transactions on Information Forensics and Security, vol. 16, pp. 4147-4183, 2021, doi: 10.1109/TIFS.2021.3096024. (Year: 2021).*

(Continued)

*Primary Examiner* — Jeremy L Gunn
(74) *Attorney, Agent, or Firm* — MARSHALL, GERSTEIN & BORUN LLP; William J. Samore

(57) ABSTRACT

Human operators (201A) perform activities within a facility in interactions with technical equipment (301A, 301B, 301C). A series (700) of images (701, 702) visualizes activities that are performed by either the same human operator (201A) or by different human operators. In the images, a computer separates areas (701*x*, 702*x*) that comprise biometric image data from areas (701*y*, 702*y*) with data that indicates the interactions. The computer obtains iden- (Continued)

tifiers (ALPHA, ALPHA) of the operators (201A) but removes the biometric image. The computer then combines images areas and provides an audit record (500) by storing the modified first and second images (701', 701') and the identifiers.

11 Claims, 11 Drawing Sheets

(56) References Cited

U.S. PATENT DOCUMENTS

| | | | | |
|---|---|---|---|---|
| 2012/0136688 | A1* | 5/2012 | Fouad | G06Q 10/063114 705/7.15 |
| 2012/0146789 | A1 | 6/2012 | De Luca et al. | |
| 2012/0146792 | A1 | 6/2012 | De Luca et al. | |
| 2013/0301934 | A1* | 11/2013 | Cok | G06F 16/58 382/218 |
| 2014/0350708 | A1* | 11/2014 | Kobayashi | G06Q 10/06 700/108 |
| 2015/0332278 | A1 | 11/2015 | Garrido et al. | |
| 2016/0306172 | A1 | 10/2016 | Chestnut et al. | |
| 2018/0012169 | A1* | 1/2018 | Sekiya | G06Q 10/06395 |
| 2019/0080274 | A1* | 3/2019 | Kovach | G06Q 10/0639 |
| 2020/0160680 | A1* | 5/2020 | Edwards | G07F 19/207 |
| 2020/0333773 | A1* | 10/2020 | Schmidt | G05B 19/41875 |
| 2022/0050999 | A1* | 2/2022 | Zheng | G06N 3/045 |
| 2023/0169709 | A1* | 6/2023 | Im | G06V 10/774 382/100 |

FOREIGN PATENT DOCUMENTS

| | | | | |
|---|---|---|---|---|
| GB | 225398 | A | 12/1924 | |
| GB | 2500823 | A | 10/2013 | |
| WO | WO-2010/017531 | A2 | 2/2010 | |
| WO | WO-2017/129636 | A1 | 8/2017 | |
| WO | WO-2017/164886 | A1 | 9/2017 | |
| WO | WO-2018072028 | A1 * | 4/2018 | G06V 40/40 |

OTHER PUBLICATIONS

"Video surveillance for food processing", downloaded from the Internet at: https://umbrellatech.co/video-surveillance-applications-for-food-processing-and-manufacturing/ 17 pp. (Jun. 12, 2018).

International Application No. PCT/EP2020/050454, International Search Report and Written Opinion, mailed Feb. 5, 2020.

Lam, AI Aids Eyes : A computer vision system to remind operators to wear safety glasses, Towards Data Science, downloaded from the Internet at: https://towardsdatascience.com/ai-aids-eyes-a-computer-vision-system-to-remind-operators-to-wear-safety-glasses-ba0a1fe51b0 (Oct. 22, 2018).

Li et al., Blur vs. Block: Investigating the effectiveness of privacy-enhancing obfuscation for images, 2017 IEEE Conference on Computer Vision and Pattern Recognition Workshops, pp. 1343-1351 (2017).

Wilber, Can we still avoid automatic face detection?, 2016 IEEE Winter Conference on Applications of Computer Vision, 9 pp. (Mar. 7, 2016).

"4 Advantages of Video Surveillance in Food Manufacturing", Umbrella Technologies, Jun. 12, 2018, 19 pages. downloaded from the Internet at: <https://umbrellatech.co/video-surveillance-applications-for-food-processing-and-manufacturing/>.

Chang, et al., "Weighted Bilinear Coding over Salient Body Parts for Person Re-identification", Arxiv.org, Mar. 22, 2018, pp. 1-22.

European Search Report for EP Patent Application No. 19152423.0, Issued on Jul. 26, 2019, 5 pages.

Liu, et al., "A Spatial and Temporal Features Mixture Model with Body Parts for Video-based Person Re-Identification", Arxiv.org, Jul. 3, 2018, pp. 1-13.

Rice et al., "Unaware Person Recognition From the Body When Face Identification Fails", Psychological Science, vol. 24, Issue 11, Sep. 25, 2013, pp. 2235-2243.

* cited by examiner (C)

(D)

(A)

(B)

COMPUTER-IMPLEMENTED METHOD, SYSTEM AND COMPUTER PROGRAM FOR PROVIDING AUDIT RECORDS THAT RELATE TO TECHNICAL EQUIPMENT

CROSS-REFERENCE TO RELATED APPLICATIONS

This is the U.S. national phase of International Application No. PCT/EP2020/050454, filed Jan. 9, 2020, which claims the benefit of European Patent Application No. 19152423.0, filed on Jan. 17, 2019.

TECHNICAL FIELD

In general, the disclosure relates to industrial processes; and more in particular, the disclosure relates to image processing with a computer-implemented method, a computer system or a computer program for image processing to provide audit records, wherein the records are related to industrial product handling processes.

BACKGROUND

Handling products in facilities, such as factories, plants, assembly lines, warehouses, laboratories, and so on is traditionally a task for human operators that interact with technical equipment, such as machines, tools, gadgets, vehicles etc. Automation does not change this. Human activities are still part of product handling processes.

In the broadest sense, product handling comprises manufacturing products, testing or analyzing products, storing products, distributing products, or even destroying them. A used herein, the term "product" is applicable for all stages of a product lifecycle and comprises: product components, intermediate products, and samples that are taken from production.

Also, there can be discrete things (e.g., the product being a bottle with a drink) and continuous material flows (e.g., supplying the water for the drink through a pipe).

The interaction between humans and technical equipment (human-equipment interaction) creates risks. One risk is related to the quality of the product. For example, at end of a production line, a product may appear acceptable for shipment to consumers, but in reality the product may have been irreparably damaged. Risks can be industry specific. Human operators may impact product performance by applying incorrect parameters, such as material quantities, time settings, pressure or temperature settings and so on. For example, in the chemical industry in general and in its branches (such as in aroma, pharma, human and animal nutrition, health industry) in particular, the operator may make a product useless by accidently touching it during production. As a consequence, the product may become contaminated with bacteria so that eventually the consumer may contract a disease. In a laboratory, test samples may be incorrectly prepared or analyzed by improper handling.

Further risks include safety hazards to the operators themselves.

To mitigate such and other risks, product handling needs to comply with requirements that are summarized by a large number of technical standards. Such requirements relate to appropriate handling instruction to the operators, parameters for operating the facilities and/or the equipment, procedures to track the production in batches or charges, cleaning the equipment (before or after use), safety precautions, and so on.

To give only a few introductory examples, in a scenario in chemical industry: standards can require personnel to adhere to predefined procedures and to create records, such as batch records, cleaning protocols, testing protocols etc.; standards can require operators to wear appropriate protective gloves (or protective garment in general), so that the risk of touching a product is minimized; standards can require the materials to be delivered via a parameterized supply chain; standards can specify the air quality within cleanrooms; and standards can require the production to be tracked by computers, in charge, batches or the like.

To give only a few example, for one of many standards for industrial product handling, the following is mentioned:

- COMMISSION DIRECTIVE 2003/94/ EC of 8 Oct. 2003 laying down the principles and guidelines of good manufacturing practice in respect of medicinal products for human use and investigational medicinal products for human use, Official Journal of the European Union, 14 Oct. 2003, L 262/22,
- ISO 9001:2015-09 Quality management systems—Requirements,
- ISO 14001:2015-09 Environmental management systems—Requirements with guidance for use,
- Food Safety System Certification (FSSC) 22000, available from Foundation FSSC 22000,
- The systematic preventive approach to food safety from biological, chemical, and physical hazards in production processes known as "hazard analysis and critical control points (HACCP)".

Standards can refer to further standards. As used herein, the term "standard" also comprises any collection of particular requirements for particular production batches.

Despite standardization, the interaction between human operators and the equipment is not free of errors or failures. Therefore, from time to time, product handling has to be monitored and checked for compliance with the standards. This is traditionally the task for so-called auditors (occasionally called "inspectors" or "examiners"). Auditors have to differentiate between information that is relevant to evaluate standard compliance (i.e. information relating to the requirements, to be included into the report), and information that must not leave the facility (i.e., information to be excluded from any reports).

As of today, auditing can't be automated. However, it is contemplated to physically locate the auditors away from the facility. US 2016/0306172 A1 explains the use of a wearable camera device to communicate data from the facility to an auditor located outside. As data is transmitted in real-time, the selective inclusion/exclusion of information remains problematic.

There is a need to provide techniques that address the inclusion/exclusion dilemma.

SUMMARY

To comply with technical standards, it is frequently required that subsequent product handling activities are performed by one and the same operator. However, it is not relevant who that operator is. More in particular, personal data of that operator is not relevant (personal data being any information relating to an identified or identifiable operator being a natural person, by reference to an identifier such as a name, an identification number, location data, an online identifier or to one or more factors specific to the physical, physiological, genetic, mental, economic, cultural or social identity of that natural person).

The present invention addresses the inclusion/exclusion dilemma by using image processing. According to embodiments of the present invention, an audit system receives images from cameras that are located within the facility. The images (i.e., pictures or photographs in electronic form, with pixels) show the operators performing predefined activities. The audit system processes biometric image data to obtain identifiers of the operators, but then disregards or removes the biometric image data. The audit system then provides an audit record with modified images in combination with the identifiers. Due to the modification, there is no personal data left in the audit record. The identifier can't be converted back to personal data.

An evaluator inspecting the audit record (i.e. looking at the identifiers in the record) can still recognize if the subsequent activities are performed by one and the same operator, or not.

This approach takes advantage of the situation that human operators usually perform the activities by hand and that viewers (of images) identify particular persons by looking at the face but not at the hand.

More in detail, a computer implemented method for providing an audit record relates to activities performed by human operators within a facility. The activities are interactions of the human operators with technical equipment. The audit record indicates performance of an activity sequence with a first activity and with a subsequent second activity by either the same human operator or by different human operators. The method comprises the following:

A series of images is being received. The images visualize the activities by human operators. The series has at least a first image of a first activity in interaction with first technical equipment and a second image of a second activity in interaction with second technical equipment.

By applying image processing to the first image and to the second image, there is separating, within the first image and within the second image, at least first and second areas. The first areas comprise biometric image data indicative of a particular human operator within a set of human operators (e.g., the operators belonging to the manufacturing facility). The second areas comprise image data indicating the interaction with the technical equipment.

By applying image processing to the first area of the first image and to the first area of the second image, identifiers of human operators among the multiple human operators are obtained. The identifiers thereby indicate performance of the first activity and of the second activity by particular human operators.

By applying image processing to the first area of the first image and to the first area of the second image, biometric image data indicative of particular human operators are removed from the first area of the first image and from the first area of the second image. The first area of the first image is modified to a modified first area of the first image and the first area of the second image is modified to a modified first area of the second image.

The modified first area of the first image is combined with the second area of the first image to a modified first image and the modified first area of the second image is combined with the second area of the second image to a modified second image.

Providing the audit record comprises storing the modified first image and the modified second image with the identifiers.

Optionally, the steps receiving, separating, obtaining, and removing are executed by a processor of the computer system using volatile memory only.

Optionally, receiving comprises to receive the series of images with time stamps of the images.

Optionally, receiving comprises to receive the series of images with receiving the first image from a first camera and receiving the second image from a second camera. The first and the second cameras are associated with first technical equipment and with second technical equipment, respectively.

Optionally, receiving comprises to receive technical parameters that relate to the technical equipment. The technical parameters are associated with the images as being part of the images or as being received in a meta-data attachment to the images.

Optionally, receiving comprises to receive technical parameters that relate to the technical equipment from an equipment interface. The technical parameters are related to either the first image or to the second image.

Optionally, receiving the series of images is triggered for particular images by a production management system that provides the identification of a particular batch. As a result of providing the audit record, the audit record is related to the particular batch.

Optionally, receiving the series of images is triggered by the production management system that provides the identification of a first batch and of a second batch. Receiving the first image of the first activity is related to both batches. Receiving the second image of the second activity is performed in batch specific versions for a second image of the first batch and a second image of the second batch. Therefore, providing the audit records comprises to provide separate audit records for the first batch and for the second batch.

Optionally, the biometric image data comprises data relating to the faces of the human operators.

Optionally, the biometric image data comprises data relating to the faces of the human operators. In step obtaining identifiers, images of the operators from a particular set of operators are taken as reference.

In one embodiment, a computer program product that when loaded into a memory of a computer and being executed by at least one processor of the computer performs the steps of the computer-implemented method.

In one embodiment, an audit system is a computer system adapted to execute the method according to any of claims. Such a system has modules that are specialized to the method steps.

BRIEF DESCRIPTION OF THE DRAWINGS

FIGS. 1A and 1B illustrate an overview of a facility with humans and with equipment, wherein FIG. 1A shows a traditional approach, and wherein FIG. 1B shows an approach that uses a computer system and a computer-implemented method;

DETAILED DESCRIPTION

Overview to Facility and System

Figure 1A:
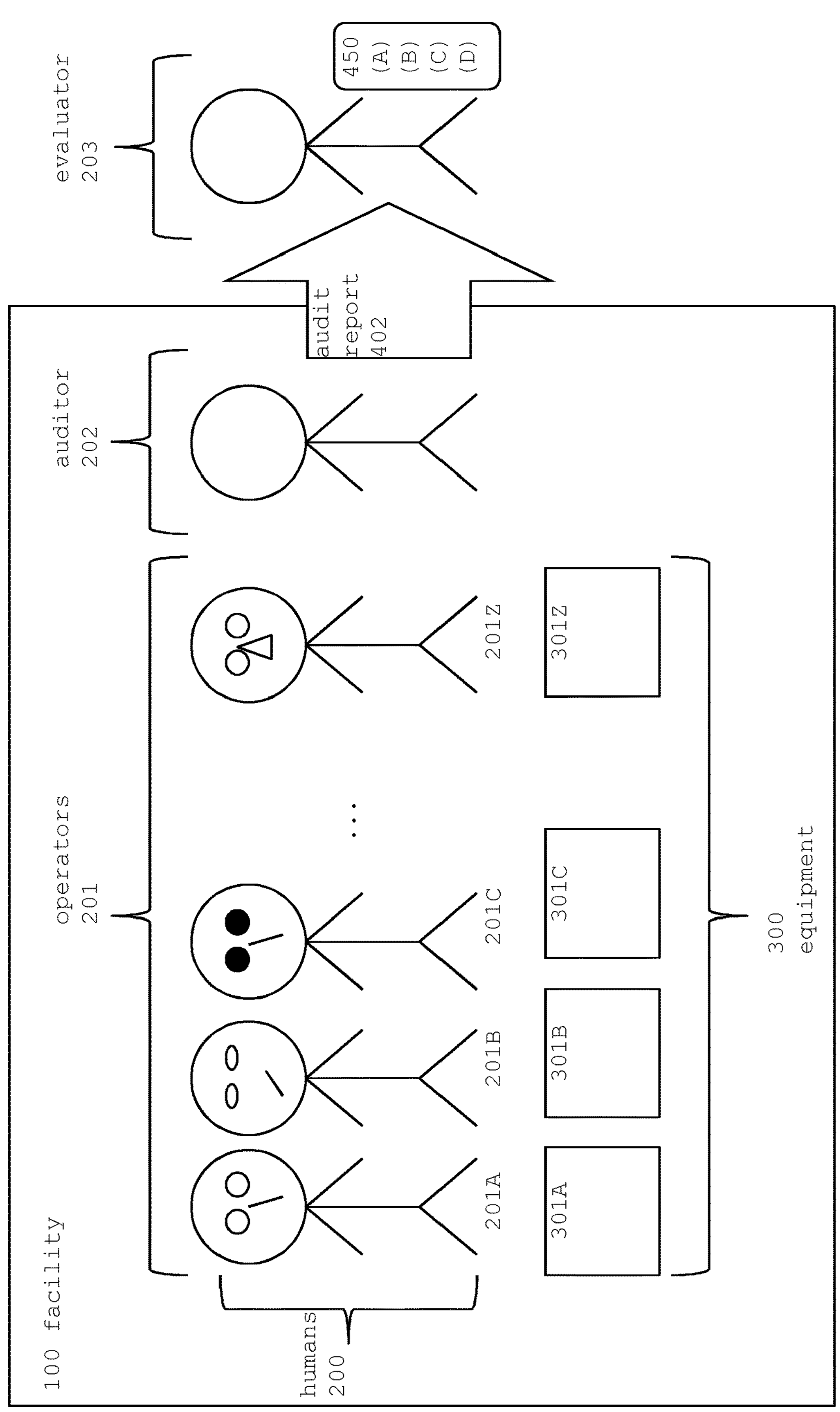
Figure 1B:
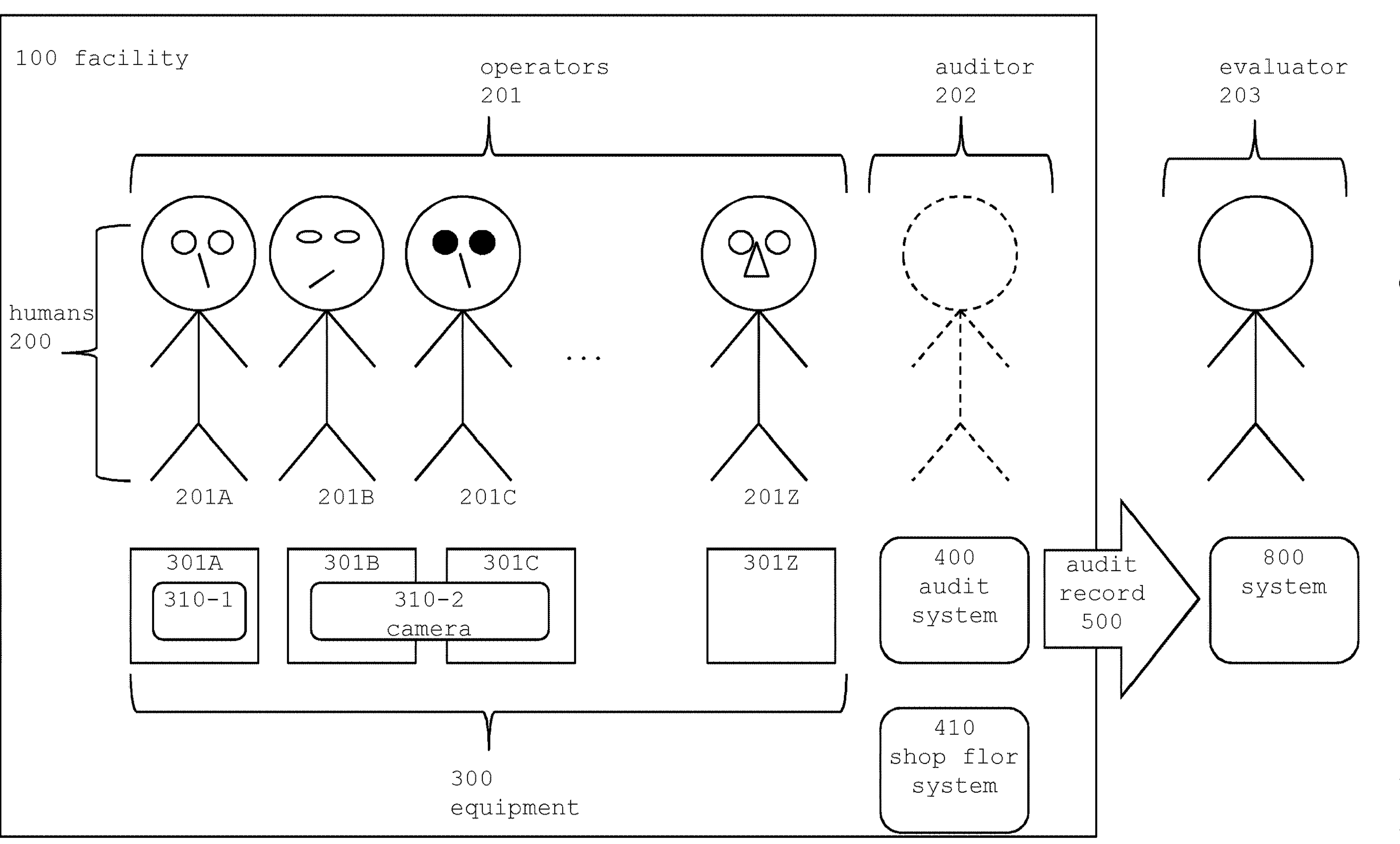

FIGS. 1A and 1B illustrate an overview to a facility 100 with humans 200 and with technical equipment 300. FIG. 1A is applicable to a traditional approach, and FIG. 1B is applicable to an approach that uses computer system 400 and computer-implemented method 600 (that will explained with details in FIGS. 4-6). For convenience, computer system 400 will be labelled "audit system".

Much simplified, facility 100 can be a plant, an assembly line, a warehouse, a laboratory and so on. Technical equipment 300 collectively stands for pieces of equipment 301A, 301B, 301C . . . 301Z. In chemical industry, examples are glove dispensers, cleanroom locks, tank reactors, bags with materials (such as ingredients), heaters, ovens, conveyor belts and others.

As used herein, standards are applicable to situations within facility 100. Description and drawings refer to facility 100 and equipment 300 in the example of a cleanroom.

Figure 2:
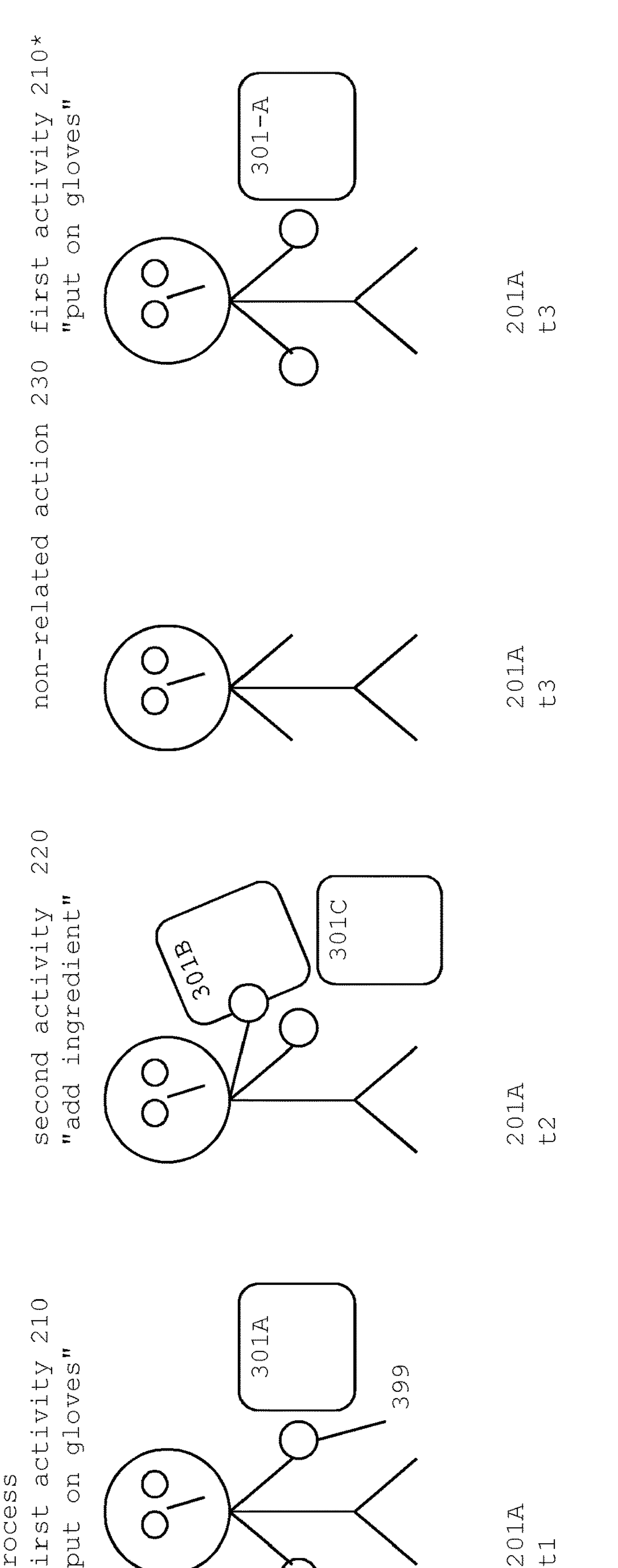
FIG. 2 illustrates an operator interacting with equipment.

In the example, standards for cleanrooms relate to technical equipment 300 such as air conditioning equipment, locks between rooms, but standards also relate to activities that human operators have to perform (cf. FIG. 2).

As used herein, humans 200 can have multiple roles (or functions), among them operator 201, auditor 202, and evaluator 203.

Operator 201 performs activities within the manufacturing facility. Usually there are multiple operators in a single facility, here differentiated as 201A, 201B, 201C . . . 201Z. There is no need to have all operators to be physically present at the same point of time. As operators 201 are humans, each one has particular biometric features: a particular face, a particular body size or body shape, a particular weight, a particular voice, and so on.

Biometric features that can be recognized by humans by looking at each other are relevant here: these are visual biometric features (i.e. face, body size/shape). In the figures, they are symbolized with different faces. For simplicity, it is assumed that identical twins are not among the operators.

Operators 201 perform activities in interaction with equipment 300. There is no one-to-one relation between particular operators and particular piece of equipment. A particular operator 201 (e.g., 201A) can interact with different pieces of equipment (e.g., 301A, 301B, 301C), simultaneously or at different points in time. All operators may interact with one particular piece of equipment (e.g., 301A), but not at the same time.

Auditor 202 (of FIG. 1A) visits manufacturing facilities and audits the performance of the activities there. Looking at the content, the audit usually comprises the determination if and how the operators (in general) perform activities in interaction with the equipment (i.e., with the pieces of equipment). The modality of the audit can comprise visual inspection (i.e., looking at the operators and/or at the equipment) and oral inspection (i.e., talking to operators and supervisors, listening to sounds etc.). As mentioned above, traditionally, auditors collect their findings in audit reports 402, in writing and/or by photographing.

As in FIG. 1A, evaluator 203 inspects audit report 402 and evaluates it in view of compliance with standard 450. Standard 450 is symbolized here by a document with a number of requirements (A), (B), (C) and (D). Description and drawings use a much simplified example for a fictitious standard (e.g., in nutrition or pharma environments) that requires the operators (A) to put on gloves while in a cleanroom lock, (B) to wear both gloves when filing ingredients into to a reactor, (C) to replace the gloves within a replacement interval (e.g., every 2 hours), and (D) to perform the activities by the same operator.

In this example, the fictitious standard is written with "positive activities", but do-not definitions could also be used.

In the example, standard 450 focuses on the behavior of operators 201 (i.e. performance of predefined activities, or non-performance), but there could be further requirements (from different standards) relating to equipment only.

Due to the nature of an audit, auditors 202 and evaluator 203 are usually not the same persons as operators 201. The auditor and evaluator functions can be performed by the same person. The figures illustrate evaluator 203 as being located outside the facility.

This does not exclude the possibility that evaluation can be supported by a computer. This will be explained in the following.

FIG. 1B illustrates the approach with audit system 400 that executes method 600. FIG. 1B shows auditor 202 by dashed lines because this function is no longer required. However, the approach is not an automation of an audit, but rather an approach to generate an audit record which allows off-line and/or remote auditing of the industrial product handling.

Cameras 310-1 and 320-2 are associated with equipment 300 to take images (or to "capture images", i.e. data-structures that represent the reality). The real-world objects from which images are taken comprise equipment and/or operators. Audit system 400 uses image-processing and provides audit record 500 as a data-structure.

In the example of FIG. 1B, camera 310-1 is associated with equipment 301A to take images when any one of the operators interacts with equipment 301A; camera 310-2 is associated with equipment 301B and 301C to take images when any one of the operators interacts with this equipment 301A, 301B or with both.

The operators do not have access to cameras 310, to audit system 400 and not to audit record 500.

FIG. 1B also illustrates that audit system 400 can be coupled to shop floor system 410 (cf. FIG. 7 as well, production management system) and that audit record 500 can be evaluated by a further computer system, such as an evaluation system 800 (that uses the standard requirements as rules for assessing audit record 500).

FIG. 2 illustrates—by way of example—operator 201A at least partially interacting with equipment. In the example, the facility is assumed to be a manufacturing facility in chemical industry. Applicable standards require that manufacturing is to be performed in a cleanroom location. As used herein, activities 210 and 220 are typical activities that are frequently performed within such a facility. Performance (or non-performance) is relevant in view of the standard. Activities 210 and 220 are recognizable by visual inspection.

In the simplified example of FIG. 2, at time point t1, operator 201A performs (first) activity 210 by going through a cleanroom lock. He washes the hands and takes on gloves 399 from a glove dispenser (here equipment 301A). From the standard, there are particular requirements to gloves (i.e., a time-limit to observe after opening the dispenser, to have sterile gloves as indicated by a particular color etc.) and there are particular requirements in view of activities (e.g., to wear them, to replace them periodically according to a replacement interval T INTERVAL etc.).

At time point t2, operator 201A is already in the cleanroom and operator 201A performs second activity 220 by opening a bag (or "sack", equipment 301B) with a food ingredient (such as, for example, sugar or flour) and pouring the ingredient into a tank reactor (equipment 301C), performing the "adding ingredient" activity. It is assumed that time points t1 and t2 are within the replacement interval T INTERVAL.

At time point t3, operator 201A has left the cleanroom for a non-related action 230 (e.g., taking a break, details not illustrated). It is assumed that the action is unrelated to the standard. It is noted that operator 201A has taken the gloves off. There is no activity to monitor, and there is no human-equipment interaction (at least no interaction of interest).

At time point t4, operator 201A re-performs the activities of t1, here first activity 210* in repetition.

Shortly looking at FIG. 1A, auditor 202 would look at operator 201A and would write the following audit report 402:

(A) put on gloves while in lock? YES (B) wear both gloves when filing ingredient to reactor? YES (C) Consider replacement interval? YES (D) Be the same operator? YES Evaluator 203 (likely the same person) would determine compliance with the standard (all YES). Potentially, audit report 402 would turn into a compliance statement (enhanced by a remark PASSED or the like).

In other words, there is proof required that a particular operator performs pre-manufacturing activities (e.g., to take on gloves) prior to the (subsequent) manufacturing activities. The proof is available in a proof document (i.e., audit report 402).

It is noted that auditor 202 can't look at the operators all of the time (i.e., t1, t2, t4, excluding t3). For auditor 202 it might be difficult to keep track of the activities of the various operators working in the same facility. An identification of the operator is required in the sense that physically the same operator performs the activities (cf. (D).

It is noted that an activity within facility 100 can be a do-not-activity (or "negative activity"), in the sense that according to standard provisions, some activities are not allowed within facility 100. Taking the example of the cleanroom, combing the hair or cleaning the fingernails is possible but not allowed inside the cleanroom (i.e., a further requirement (E) as a negative activity). There are dedicated rooms—bathrooms or the like—for doing to. In contrast, visiting the bathroom is an example for a non-related action 230 (at t3) that is not to be monitored (by the method that is described here). In other words, performance of a do-not-activity is of interest for the evaluation, but performance of a non-related action is not of interest.

Figure 3:
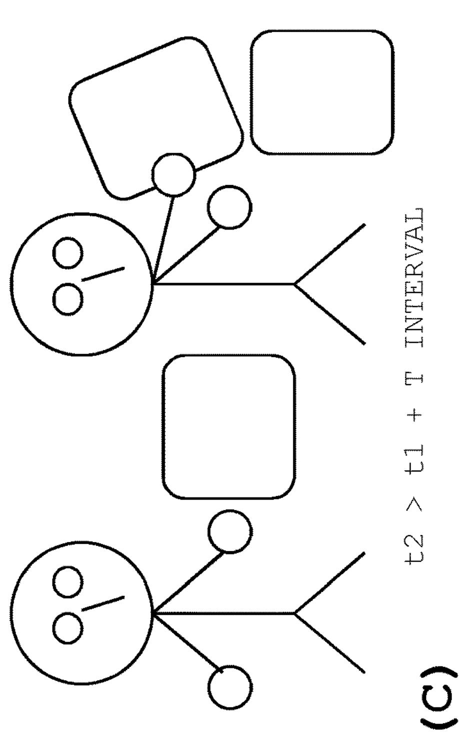
FIG. 3 illustrates non-compliance with a standard in situations (A) to (D)
Figure 3:
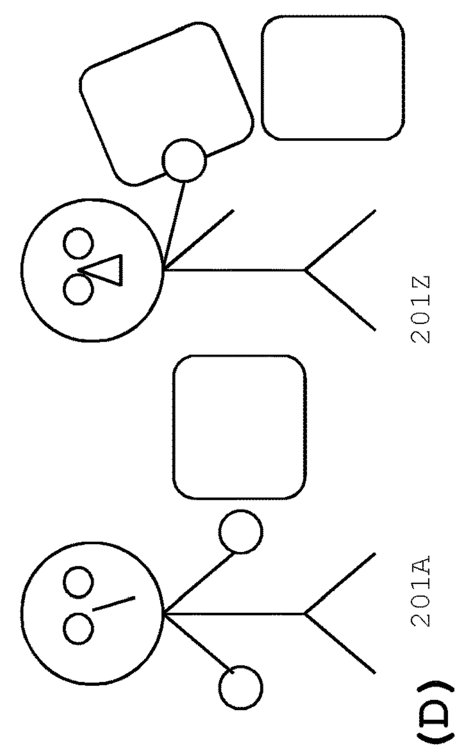
Figure 3:
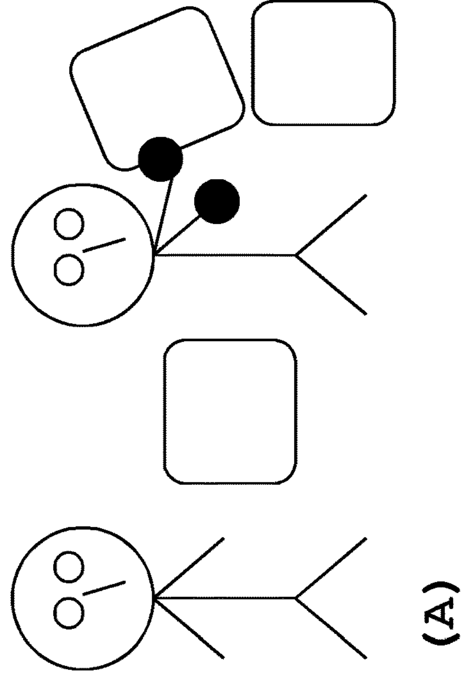
Figure 3:
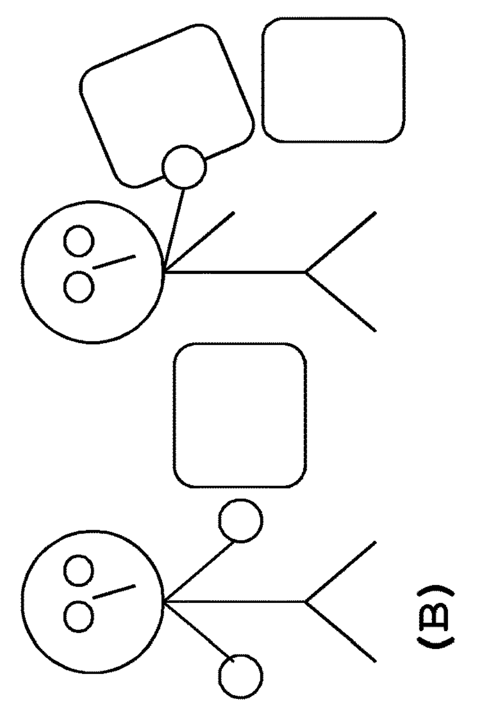

However, there are many further situations that could lead to non-compliance. Auditor 202 would have to keep a watching eye on that. This is explained in the following:

FIG. 3 illustrates non-compliance with a standard in situations (A) to (D), by way of example. It is noted that non-compliance with at least one standard requirement leads to non-compliance.

As in case (A), the operator does not put on gloves while in the lock. The operator wears gloves, but potentially different ones.

As in case (B), the operator does not wear both gloves when filing ingredient to reactor. The operator has lost one.

As in case (C), the operator did not consider to replace the gloves (with the replacement interval).

As in case (D), there are different operators interacting.

Method for Providing an Audit Record

Figure 4:
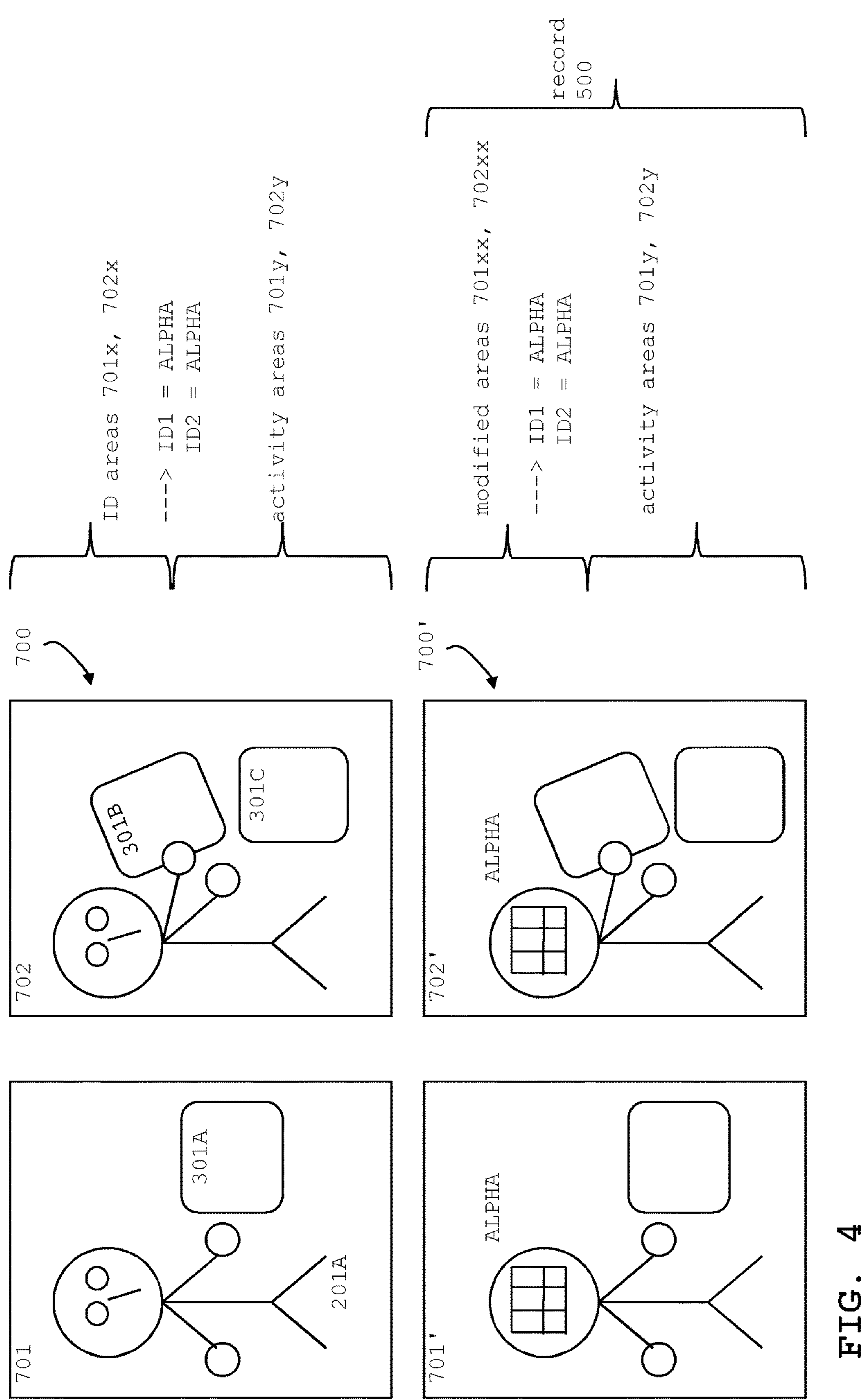
FIG. 4 illustrates the computer system performing image processing that leads to an audit record in an example with a first scenario.
Figure 5:
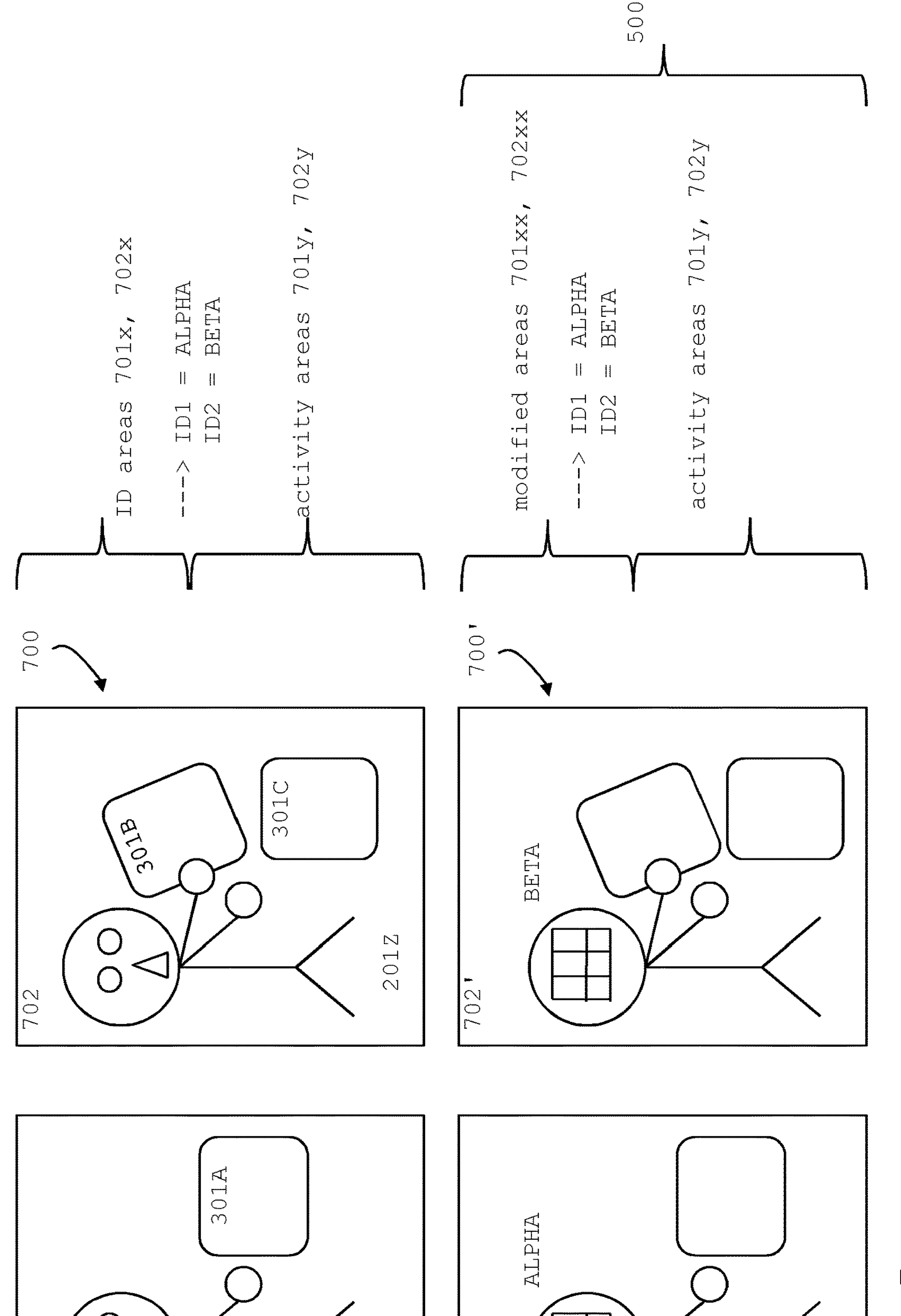
FIG. 5 illustrates the computer system performing image processing that leads to an audit report in an example with a second scenario.
Figure 6:
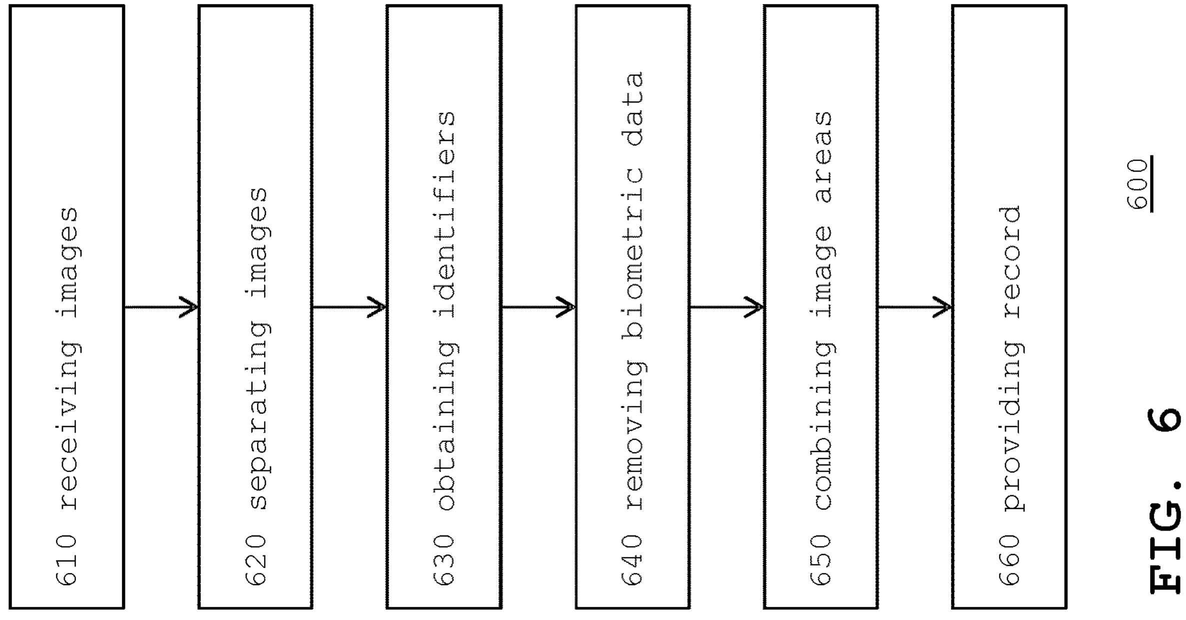
FIG. 6 illustrates a flow-chart diagram of the computer-implemented method for providing an audit record that relates to activities performed by human operators within the facility in interaction with technical equipment.

FIGS. 4-6 illustrate computer system 400 (i.e. the audit system) executing a computer-implemented method 600 for providing audit record 500. Since method 600 comprises image-processing, FIG. 4-5 illustrate images. FIG. 6 illustrates a flow-chart (with steps 610 to 660). For simplicity, FIGS. 4-6 do not illustrate computer components such as processor or memory, examples are given in FIG. 12. Executing method 600 does not necessarily result in an audit record with a standard-compliance statement (e.g., PASSED) or with a standard-non-compliance statement (e.g., FAILED). Executing method 600 is applicable for scenario that lead to PASSED (cf. FIG. 4) and that lead to FAILED (cf. FIG. 5).

FIG. 4 illustrates the computer system executing image processing that leads to audit record 500 in an example with a first scenario. References (such as "301") are not part of the images.

Audit system 400 (cf. FIG. 1B) receives series 700 of images 701 and 702 (from the cameras). In the example, image 701 comes from camera 310-1 and image 702 comes from camera 310-2. The cameras take the images at subsequent points in time, and—in embodiments—the images have time-stamps.

In series 700 of images 701 and 702 (two images being just a simplification for convenience of explanation), image 701 has captured the first activity (in interaction with first equipment (cf. 210 in FIG. 2) and image 702 has captured the second activity (interaction as well, cf. 220 in FIG. 2).

Audit system 400 then applies image-processing techniques, to separate images into ID areas 701*x*, 702*x* and activity areas 701*y*, 702*y*), to obtain identifiers (such as ALPHA) and to remove biometric data.

Audit system 400 separates (cf. step 620) the images into ID areas 701*x*, 702*x* (of images 701, 702) and into activity areas 701*y*, 702*y* (of images 701, 702 as well). The areas are pluralities of pixels that are contiguous. Areas have shapes such as rectangle, circles or others. Areas can be processed by using coordinates, such as XY-coordinate for pixels. Similar to exclaves/enclaves known in geography, one area can surround another area.

The ID areas comprise biometric data (e.g., the image of the faces) and the activity areas show the activities (i.e. the operator's interaction with the equipment).

Audit system 400 then processes the ID areas and obtains (step 630) identifiers ID1, ID2 for both ID areas 701*x* and 702*x*, respectively. In the example of FIG. 4, the identifier ID1 and ID2 are ALPHA.

Audit system 400 removes (step 640) biometric data (cf. step 640). The figure illustrates this with a graphical anonymizer. But other approaches can be used as well (e.g., by switching substantially all pixels of the ID areas to a single color, such as black or white). Removing goes in one direction, there is no opportunity to re-establish the content (i.e. to get the biometric data back). Removing the biometric data is a one-way data conversion. The identifier (ALPHA) can't be converted back to personal data.

Removing content can reduce the number of bits and bytes to store the image, in the last step. This is a further beneficial effect. The saved bits and bytes could be uses to convey data (e.g., to convey parameters as in FIGS. 8A, 8B, 8C).

Audit system 400 combines (650) modified first area 701*xx* of first image 701 with second area 701*y* of first image 700 to modified first image 701'. Audit system 400 combines (650) modified first area 702*xx* of second image 702 with second area 702*y* of second image 702 to modified second image 702'.

Audit system 400 provides audit record 500 by storing modified first image 701', modified second image 702' (i.e., modified series 700') and storing the identifiers (e.g., ID1=ALPHA, ID2=ALPHA) for each modified image.

For convenience, the identifiers (e.g., ALPHA) are illustrated as part of modified images (i.e. the identifier is embedded), but the identifiers can be related to the modified images otherwise (e.g., as meta-data, with known-data binding techniques).

It is noted that audit record 500 does not provide an evaluation (PASS, FAILED) in view of the standard, but that audit record 500 contains all information needed to perform the evaluation.

Evaluator 203 (cf. FIG. 1B) can inspect the modified series 700' (i.e. report 500) and check if the requirements are in compliance:

(A) put on gloves while in lock? YES, this is visible in image 701'

(B) wear both gloves when filing ingredient to reactor? YES, this is visible in image 702'

(C) Consider replacement interval? YES, this is not illustrated in the figure, but the images 701, 702 have time-stamps, and the time-stamps are taken over to modified images 701' and 702' as well. Looking at the time-stamps, evaluator 203 can determine if the interval has passed or not.

(D) Be the same operator? YES, evaluator 203 reads ALPHA in association with both images 701' and 702'.

Looking at report 500, evaluator 203 can make a judgement in view of standard (non) compliance. But different from the traditional auditor (cf. 202 in FIG. 1A), the evaluator does not have to exclude information. In other words, information that must not leave the facility (such as face data of the operators). The above-mentioned inclusion/exclusion dilemma has been addressed.

FIG. 5 illustrates the computer system image processing that leads to an audit report in an example with a second scenario. The process in FIG. 5 is the same as in FIG. 4, but the content of audit report 500 is slightly different. As in case (D) of FIG. 3, there are activities performed by different operators (cf. 201A and 201Z).

While report 500 (of FIG. 5) does not indicate compliance, it indicates ALPHA (as the operator performing the first activity) and BETA (as the operator of the second activity). Evaluator 203 would determine non-compliance with the standard (e.g., FAILED). The inclusion/exclusion dilemma has been addressed as well.

It is noted that images 701 and 702 (in FIGS. 4-5) would be sufficient for a person in the auditor/evaluator role to determine compliance (FIG. 4) or non-compliance (FIG. 5), but inclusion/exclusion would still be an obstacle.

FIG. 6 illustrates a flow-chart diagram of computer-implemented method 600 for providing audit record 500 that relates to activities 210, 220 performed by human operators 201 within facility 100 in interaction with technical equipment 300.

Audit record 500 indicates performance of an activity sequence (cf. 210, 220 in FIG. 2) with a first activity (e.g., 210) and with a subsequent second activity (e.g., 220). The activities are performed either by the same human operator (e.g., 201A as in FIG. 4) or by different human operators (e.g., 201A and 201Z as in FIG. 5). Method 600 is performed by audit system 400 (cf. FIG. 1B).

In receiving step 610, the audit system receives a series 700 of images 701, 702 that visualize the activities by human operators (i.e. the image have captured pictures of the activities). Series 700 has at least first image 701 of first activity 210 in interaction with equipment 301A, and has second image 702 of second activity 220 in interaction with second equipment 301B, 301C.

By applying image-processing to first image 701 and to second image 702, the audit system executes separating step 620. Within first image 701 and within second image 702, the audit system separates at least first areas 701*x*, 702*x* and second areas 701*y*, 702*y*. First areas 701*x*, 702*x* comprise biometric image data indicative of a particular human operator 201A within the set of human operators 201 belonging to manufacturing facility 100. Second areas 701*y*, 702*y* comprise image data indicating the interaction with technical equipment 301A, 301B, 301C (cf. FIGS. 4-5).

By applying image-processing to first area 701*x* of first image 701 and to first area 702*x* of second image 702, the audit system performs obtaining identifiers step 630. It obtains identifiers ALPHA, BETA of human operators 201 among the multiple human operators. The identifiers thereby indicate performance of the first activity and of the second activity by particular human operators (as in FIG. 4, ALPHA does both; as in FIG. 5, ALPHA first activity, BETA second activity).

By applying image-processing to first area 701*x* of first image 701 and to first area 702*x* of second image 702, the audit system executes removing biometric image data step 640. The biometric data is indicative of particular human operators from first area 701*x* (ID area) of first image 701 and from first area 702*x* of second image 702. First area 701*x* of first image 701 is modified to modified first area 701*xx* of first image 701 and first area 702*x* of second image 702 is modified to modified first area 702*xx* of second image 702. The second areas (the activity areas) remain unchanged.

In combining step 650, the audit system combines modified first area 701*xx* of first image 701 with the second area (701*y*) of first image 701 to modified first image 701' and combines modified first area 702*xx* of second image 702 with second area 702*y* of second image 702 to modified second image 702'.

In providing step 660, the audit system provides audit record 500 by storing modified first image 701', modified second image 702' with the respective identifiers (i.e. the identifiers for the first and for the second images). Audit record 500 does not necessarily indicate standard-compliance or not.

FIG. 6 also illustrates a computer program or a computer program product. The computer program product—when loaded into a memory of a computer and being executed by at least one processor of the computer—performs the steps of the computer-implemented method. So in other words, the blocks in FIG. 6 illustrate modules of a computer that is part of audit system 400. More in detail, the computer program comprises an image receiver module, an image separator module, an identifier obtainer module, a biometric data removal module, an image area combiner module, and a record provider module.

Multiple Evaluators

While FIGS. 1A and 1B are simplified in illustrating a single facility and a single evaluator, it is noted that a single facility may manufacture products for multiple customers, and hence for multiple evaluators. Data exclusion is important: audit data for a first evaluator has to be separated from audit data for a second evaluator. The description now explains how production control signals can be used (in synergy) to separate the records.

Embodiments with Batch Separation

Figure 7:
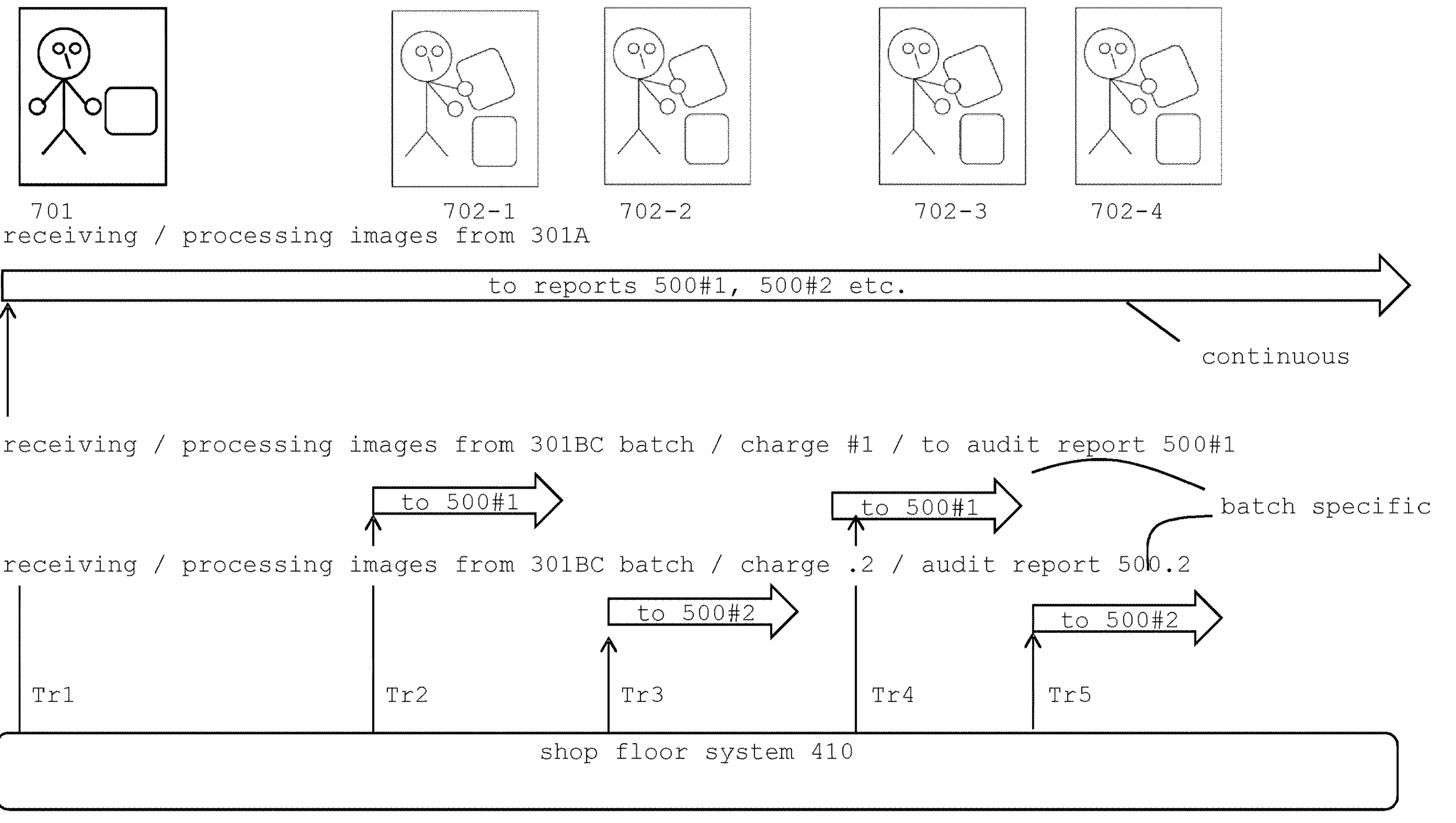
FIG. 7 illustrates the execution of method steps separated for different production batches.

FIG. 7 illustrates the execution of method steps separated for different production batches (or "charges"). The steps are illustrated by right-going large arrow with text.

Shop floor system 410 is a production management system (such as a Distributed Control System DCS, Process Control System PCS) that is communicatively coupled to audit system 400 (cf. FIG. 1B). Shop floor system 410 sends triggers (symbolized by vertical arrows Tr1 to Tr5) to audit system 400 (and/or to the cameras). Creating interfaces between systems 400/410 for the triggers is within the expertise of those skilled in the art.

In the simplified illustration, there is an assumption to have a manufacturing process that differentiates between two separate production batches (or charges). Some activities (human-equipment interaction) are applicable to both batches, such as activity 210.

In method 600, receiving step 610 can be triggered for individual images by production management system 410 that provides the identification of a particular batch. As a result, in step 660 providing audit record 500, the audit records 500#1, 500#2 are related to the particular batches.

In the example of FIG. 7, system 410 sends triggers Tr1 to Tr5 consecutively. By sending Tr1, system 410 causes system 400 to continuously receive images 701 (first activity, camera 310-1), for example, when every time an operator enters the lock. For convenience, FIG. 7 shows only one image. The images (in modified form, cf. FIGS. 4-6) will go into records 500#1 and 500#2 for batches #1 and #2. The activity is applicable for all batches. There is no need to hide (modified) images because the first activity is the same for all batches.

Trigger Tr2 causes system 410 to process image 702-1 (second activity) into record 500#1 for batch #1; trigger Tr3 to process image 702-2 into record 500#2 for batch #2; trigger Tr4 to process image 702-3 into record 500#1; trigger Tr5 to process image 702-4 into record 500#2 and so on.

More in general, receiving 610 the series of images is triggered by the production management system that provides the identification of a first batch #1 and of a second batch #2, wherein receiving first image 701 of first activity 210 is related to both batches #1 and #2, wherein receiving second image 702 of second activity 220 is performed in batch specific versions: for a second image 702-1, 702-3 of the first batch and second image 702-2, 702-4 of the second batch. Providing the audit records comprises to provide separate audit records 500#1, 500#2 for the first batch and for the second batch.

Embodiments with Parameters

Figure 8C:
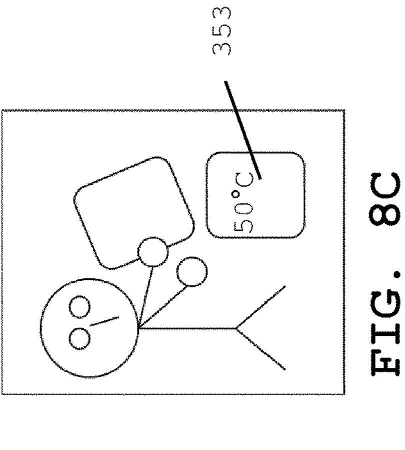
FIGS. 8A, 8B and 8C illustrate images showing equipment with a representation of technical parameters.
Figure 8B:
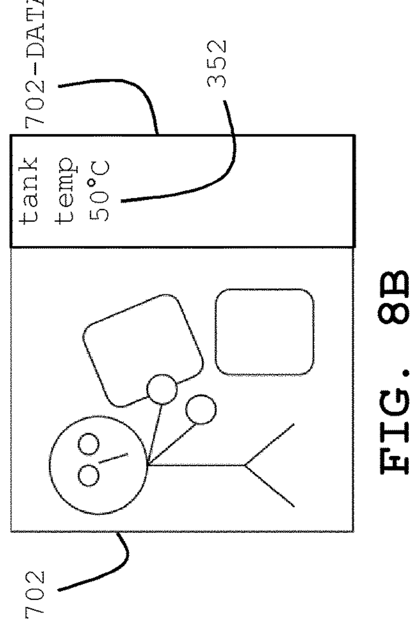
Figure 8A:
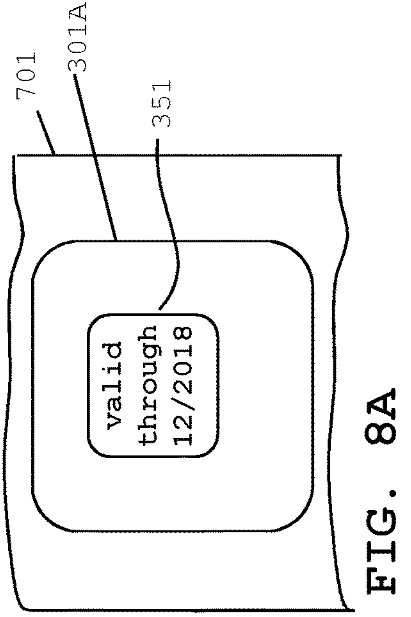

FIGS. 8A, 8B and 8C illustrate images showing equipment with a representation of parameters 351, 352, 353. The parameters are equipment parameters.

In the example of FIG. 8A, equipment is symbolized by the glove dispenser (301A) having a label. The label is captured by image 701 (shown partially). The label indicates a consumption due date as parameter 351 (e.g., "valid through December 2018").

In the example of FIG. 8B, image 702 has a meta-data attachment (702-DATA) to indicate parameter 352 of the reactor tank (e.g., a particular temperature 50° C. within the tank).

In the example of FIG. 8C, parameter 353 is embedded into the image (here for the temperature).

Technical parameters can be of interest to the evaluator. For the evaluator this information can be relevant to check for standard compliance.

Parameters can be available at equipment interfaces, such as communication devices that can be part of the equipment (e.g. data output, interfaces to industrial data busses, to computer networks etc.). Such parameters can comprise measurement values for the equipment (such as from sensors, meters etc. for pressure, temperature, ingredient amounts etc.). Parameters 351, 353 can be color-coded parameters.

The example of FIGS. 8A, 8B and 8C can conveniently be applied to further illustrate the batch separation (cf. FIG. 7). Just taking an example, activity 220 could require the ingredient to be flour of the type 405 in the first batch, and flour of type 550 in the second batch. This type parameter is usually printed on the bags (cf. parameter 351 in FIG. 8A). The different flour types may stand for the above-mentioned collection of particular requirements for particular production batches (e.g., the batches with different flour).

The modality of communicating the parameters (FIG. 8A in the image, FIG. 8B in the meta-data, or FIG. 8C as embedded) does not matter. In terms of method 600, receiving 610 can comprise to receive technical parameters 351, 352, 353. The parameters are associated with the images as being part of the images (FIGS. 8A, 8C) or as being received in a meta-data attachment (702-DATA) to the images (FIG. 8B).

As the parameters are technical parameters, they are not related to the biometric data. Therefore, the parts of the images with the parameters belong to the second areas (or to the meta-data) that go through processing substantially unchanged. It is contemplated that—if parameters are embedded into images—the location of the embedded parameter is sufficiently distant from the ID areas so that accidentally removing the embedded parameter is prevented.

Embodiments with Having Multiple Cameras

Figure 10:
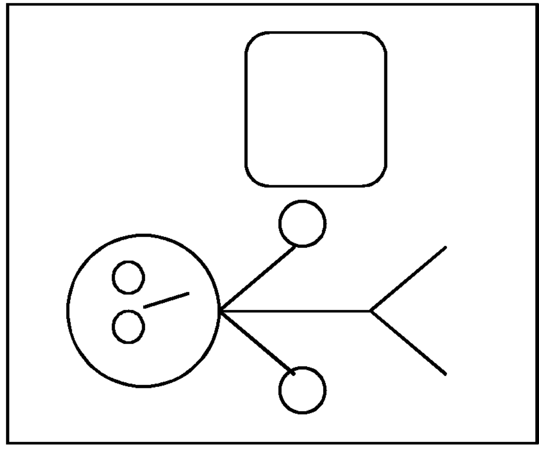
FIG. 10 illustrates embodiments of cameras with modified lenses that send images to the computer system.
Figure 10:
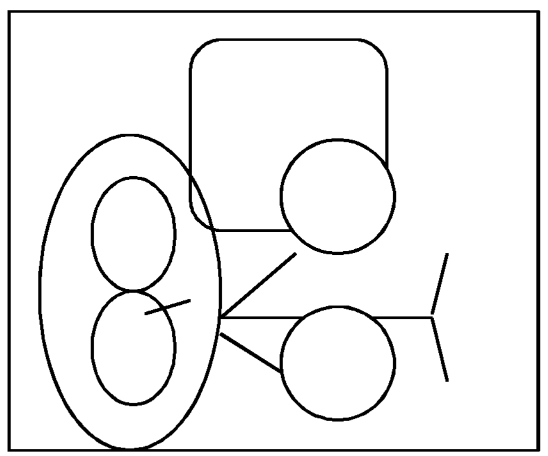
Figure 10:
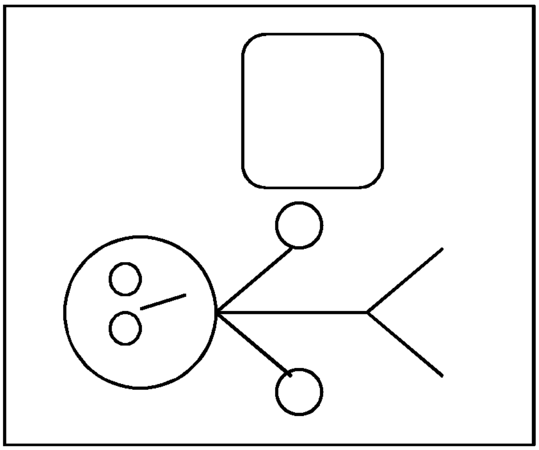

FIG. 10 illustrates embodiments with multiple cameras that send images to the computer system. The figure shows image 701-C1 and 701-C2 simultaneously taken by two cameras. One image shows the operator in front, and the other image shows the operator in a side view. Method 600 can be applied to both images so that record 500 (cf. FIGS. 4-5) is enhanced by images from different directions. A multi-camera approach is potentially applicable to other cameras in the facility as well. In other words, an image (to be processed, to be provided for the record) can be a collection of multiple images from multiple cameras.

In view of method 600, receiving 610 can comprise to receive a plurality of images taken from different directions, wherein the images are taken simultaneously. As used herein, "simultaneously" is understood as a time frame by that the operator performs the activity.

Not all method steps have to be applied to both images. The front view in image 701-C1 might be more suitable for obtaining the identifiers (ALPHA, BETA, cf. step 630), and the side vide in image 701-C2 might be more suitable in showing the activity. There is difference in the need to execute method steps: image 701-C1 is being processed including obtaining identifiers; and image 701-C2 is processed only partially (potentially no need to obtain the identifiers at all). This difference can provide more computational efficiency for system 400 executing the method.

Embodiments with Optimizing the Optical Resolution

FIG. 10 illustrates embodiments with images that the cameras send to computer system 400 (cf. FIG. 1B). Image taking can be optimized by allocating relatively high resolution (i.e. pixel per area) to objects with relatively high relation to the activities. Selecting the resolution depends on a variety of factors, among them the ability for evaluator to see that the operators had been doing, and/or the ability for computers to identify content, such as by optical character recognition (OCR) if a computer (such as system 800) is used to recognize parameters (cf. FIGS. 8A, 8C).

Persons of skill in the art can install cameras with suitable optics. For example, the focal length of the camera objective can be selected such that the one image includes the human operator (at least with the biometrics) and the technical equipment.

Depending on the optics of the camera, the scaling of the real-world objects (i.e., as mentioned above, operator and equipment) to the pixels on the camera sensor can be differentiated by the optics of the camera lenses. In the following, camera 310-1—the camera in the cleanroom lock—is used as example.

Normal image 701*a* (left side of the figure) is image 701 as explained above in FIGS. 4-5. The scaling from real-world objects to the pixels in substantially constant throughout the image. In other words, the proportions remain unchanged. A person is depicted with a head-to-body ratio that corresponds to reality, a square remains a square, and so on.

Scaling-modified image 701*b* has been captured with a special optical lens that magnifies the regions in interest, here the face, the hands and the glove dispenser (cf. equipment 301A). The magnification is an optical magnification so that the region of interest is captured with a relatively larger number of pixels. In other words, the pixel resolution is enhanced. On the other hand, regions of less interest—here for example the feet of the operator—can be captured with a relatively low number of pixels (if captured at all).

As the regions of different interest can be identified in advance, the persons of skill in the art can set the optical magnification accordingly. According to the type of activity, different parts of the body might be monitored. For example, the feet of the operators could be monitored indeed, if a standardized activity requires the operator to put on special shoes for cleanroom use. In such cases, the magnification would be highest for the foot region.

Scaling-modified image 701*b* appears distorted, but for a computer this distortion does not matter much. The degree of distortion is limited by the technical ability of the audit system to obtain (step 630) the identifiers (ALPHA, BETA), and by the cognitive ability of the evaluator to see the activities (by inspecting audit record 500). In other words, it does not matter if the operator and/or the equipment appear on the image in disturbed form. Since the evaluator knows where to look at, the burden is low.

Audit computer 400 can execute the processing steps (i.e., separating 620, obtaining 630, through combining 650) with either version (normal image 701*a* or with scaling-modified image 701*b*). Using the scaling-modified version 701*b* can have the advantage to show more details. For example, version 701*b* may be more suitable to show the technical parameters (cf. FIGS. 8A, 8C) than version 701*a*.

As illustrated on the right side, scaling-modified image 701*b* could be pre-processed back to normal image 701*c* (before, during or after processing).

It is noted that the image captured with special optics can be used as modified image (cf. 701' and 702' in FIG. 5). For the evaluator, the content is important (such as the added identifier ALPHA, BETA etc., or the technical parameter), but not the shape of the operator or the shape of the equipment.

Special optics can be implemented by wide-angle lenses, with the lens angle large enough to catch both the operator and the equipment. Wide-angle lenses can be implemented as so-called fish-eye lenses (or frog-eye lenses). Such lenses are known in the art for decades (in the patent literature, for example in GB 225,398 and U.S. Pat. No. 2,247,068 A).

In other words, the optics provides images in that some parts appear to be zoomed in and in that some parts appear to be zoomed out. Since the activities are performed in repetitions (cf. FIG. 2), there is no need for re-adjusting the optics for each image.

Embodiments with Images being Part of a Video

Figure 11:
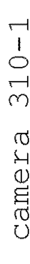
FIG. 11 illustrates a series of multiple images taken by the cameras.
Figure 11:
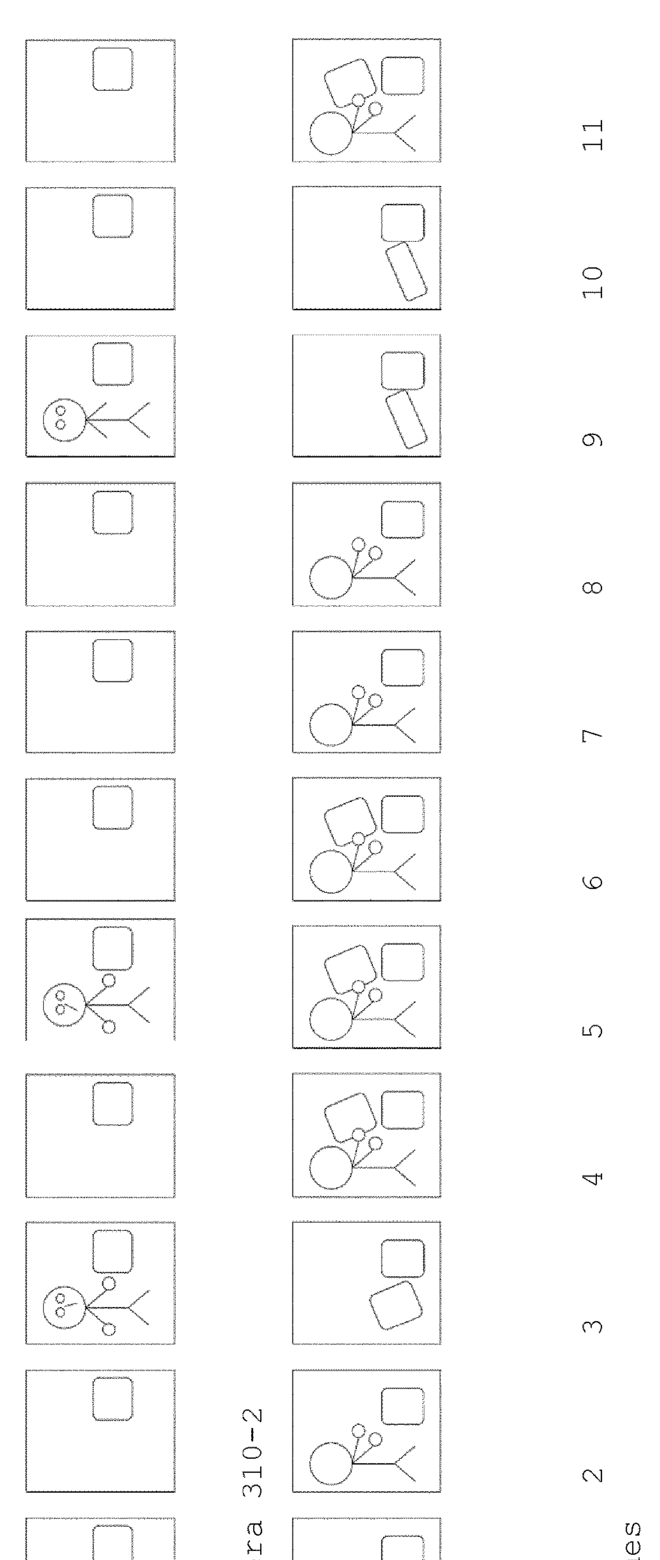

FIG. 11 illustrates a series of multiple images taken by the cameras, such as camera 310-1 (associated with the cleanroom lock) and camera 310-2 (associated with the tank reactor). As series 700 (of images) can be stored as a video, it is possible to provide report 500 in that image 701' is part of a first sub-series (showing the first activity) and in that image 701' is part of a second sub-series (showing the second activity).

It is noted that—for records 500 with video—removing (step 640) biometric data would have to be performed for all images of the video that contain such data. However, obtaining identifiers (step 630, potentially more computation intensive) would have to be performed with (at least) one image only.

The example of FIG. 11 shows some video frames only. They are numbered from 1 to 11. The figure is much simplified in the number of images (or video frames). For example, using a video with 24 image-frames per second, and assuming two seconds to put on the gloves, 48 frames would show that activity (i.e. activity 210, cf. FIG. 2).

Assuming synchronization (frame 1 of both camera with the same time stamp, same inter-frame time distance), frame 3 of camera 310-1 would correspond to image 701 (that system 400 receives), frames 4-6 of camera 310-2 would correspond to image 702 (that system 400 receives as well).

Establishing the series 700 (of the first image 701 and the second image 702) can be performed after the video was taken (assuming that the video was stored), and both images can be related trough the operator identification (e.g., ALPHA).

It is also possible to inspect particular images for non-compliance with the standard and to identify follow-up activities. For example, in frame 9 of the lock camera, the operator has forgotten to put on gloves. He or she can be identified (i.e., BETA), and images showing BETA in subsequent activities (e.g., frames from tank reactor camera) can be used to identify non-compliance (cf. requirement (B), in this case identifiable from a single frame alone).

The description continues by discussing further aspects, in relation to the figures in general.

There might a risk that operators or other persons (in facility 100) interact with audit system 400, to manipulate the reports. System 400 can be protected by security measures. It is also possible to add graphical data to the (modified) images in record 500 to identify system 400 (as the processing entity), by techniques such as watermarking.

Looking from a broader perspective and touching business considerations, evaluators 203 (in FIG. 1B) can work for a customer. To stay with the chemical industry, the customer could be a different industrial company or could be a retailer. This customer would receive audit record 500. There are many ways to communicate such data, for example by using a computer portal (at audit system 400) to that the customer has access. The customer can operate evaluation system 800 that assists in performing the evaluation.

In that sense, the customer can look—at least virtually—into the facility, but with a major difference. Unlike auditor 202, the customer would see data that is of interest (that is relevant to evaluate standard compliance, but not see information that must remain within the facility, cf. above). Again, the inclusion/exclusion dilemma is addressed.

Further Embodiments

The description now investigates potential further constraints and approaches to address them.

Operators on the Images

The first constraint relates to the suitability of the images in view of the operators.

As illustrated, cleanroom operators wear gloves. But in many industries, the operators wear special clothing as well. The clothing can comprise some sort of headgear (that covers the hair, so that the hair can't be on the image). Eventually, the operators may wear masks (like surgeons) so that faces are on the image only completely.

However, there is no need to obtain the identifiers (ALPHA, BETA) with sophisticated face recognition techniques that are applicable to recognize faces (e.g., in social networks).

As the number of operators within the facility is limited (e.g., 1.000 operators), it is possible to use artificial intelligence to train computers to recognize the faces of these operators only. For example, the operators could be photographed (dressed in working gear) and identifiers (i.e., from ALPHA_1, ALPHA_2 . . . ALPHA_1000 could be used for training (supervised training).

In terms of method 600, the biometric image data comprises data relating to the face of the human operators, and in step obtaining 630 identifiers, images for a predefined set of operators are used as reference. The set of operators can comprise the operators that are associated with the facility (e.g., its employees), or with particular parts of the facility (e.g., operators working in a particular sub-section of the facility), or with particular equipment (e.g., operators working with the reactor tank), or the operators that are working in the facility at a particular time interval (e.g. during the particular working shift in that the product batches are being produced).

Some of the operators wear protective glasses (or protective eyewear in general), but the glasses are clear enough to perform face recognition.

Technical Measures to Isolate Image Data

The second constraint relates to the protection of data against accidental misuse. Series of images 700 (that the audit system receives from the cameras) contains information that may allow a viewer to identify a particular person.

To limit the risk that such information is accidentally leaving the facility, the method steps receiving 610, separating 620, obtaining 630, and removing 640 can be executed by a processor of the computer system 400 using volatile memory only. In other words, image data remains within the random access memory RAM of the computer processor as long as ID areas 701*x*, 702*x* (cf. FIGS. 4-5) are not yet removed. Combining 650 (i.e. by accessing modified areas 701*xx*, 702*xx*) can be executed in non-volatile storage (e.g., hard drive storage, solid-state drive storage). From a different perspective, technical measures to intercept data from memory are more complicated than technical measures to intercept data from storage, and the approach takes advantage of this difference.

In view of the above-introduced batch separation (cf. FIG. 7), using volatile memory further reduces the potential risk to cross-feed information from one batch to another batch.

It is however possible to perform the steps in non-volatile memory (i.e., with a database) and to separate the batches at a later point in time (when the second image has been taken).

Combining Embodiments

Figure 9:
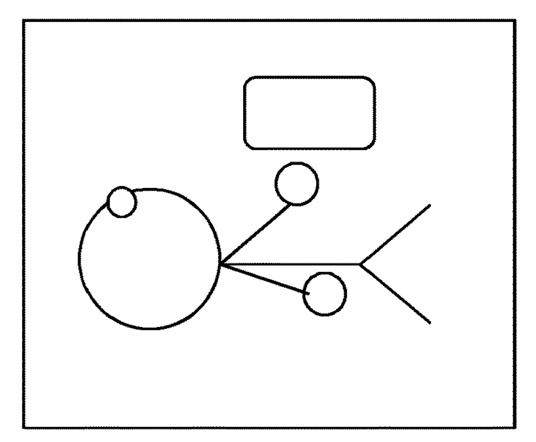
FIG. 9 illustrates embodiments with multiple cameras that send images to the computer system.
Figure 9:
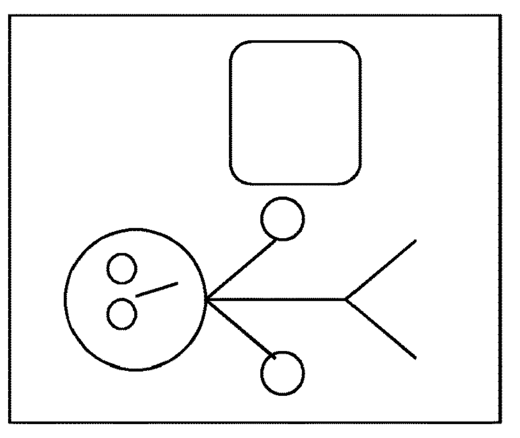

As explained above, the cameras can be implemented differently, and the description has explained two major directions:

- differentiation by the number of images taken simultaneously, to have images from different directions (cf. FIG. 9),
- differentiation by the optics of the camera to the view area to select an appropriate area-dependent image resolution (cf. FIG. 10)

Further implementations are possible, such as using cameras with zoom lenses. It is possible to control the cameras from signals derived from shop floor system 410. In this case, batches can even be differentiated. As in FIG. 7, record 500#1 for the first batch can use different camera settings than record 500#2 for the second batch.

Camera settings (directions, movements such as zooming, panning, tilting) can be obtained as pre-defined settings. The pre-defined settings can be provided by shop floor system (410 in FIG. 1B). The production activities can be documented for different batches differently, by records with still images or with videos.

Post-processing images is contemplated as well, such as by applying digital zoom when audit record 500 is presented to evaluator 203.

Detecting Compliance at an Early Stage

Records can be simplified by storing data sets that represent activities performed by operators. Taking FIG. 2 as the illustrative example, the simplified record could comprise the following data sets:

- first activity "put on gloves" by ALPHA at 09.00 hours,
- second activity "add ingredient" by ALPHA at 09.10 hours,
- first activity "put on gloves" by ALPHA at 10.10 hours and so on.

In such an embodiment, storing the (modified) images may not be required. The simplified record may be the basis for evaluation. But the simplified records can be used outside an auditing context to alert operators if standard non-compliance becomes possible.

Activities With Manufacturing as Central Activity

The audit system 400 provides audit record 500 for activities in the facility. The activities can comprise pre-manufacturing activities (such as, for example, activity 210 "put on gloves"), manufacturing activities (such as, for example, activity 220 "add ingredient") and post-manufacturing activities (such as, for example, to clean equipment after use).

Location of the Audit System

In FIG. 1B, audit system 400 is illustrated as belonging to facility 100 (cf. the large rectangle). However, audit system 400 does not have to be physically be implemented on the premises of the facility, it can be implemented by a computer system remote to the facility.

Real-Time Aspects

Although audit system 400 provides the results as records (i.e., data-structures to be stored), some real-time or same-time aspects can be considered as well. For example, a trigger to start receiving an image (or receiving a series of images) can also come from a further computer system, such as from evaluation system 800 (cf. FIG. 1B). An evaluator may decide to start monitor the production from a particular point in time (e.g., when a particular batch is being produced).

Implementation Details

The cameras are communicatively coupled to the audit system. FIG. 1B does not show this connection for simplicity, but appropriate connections are known in the art (e.g., via a network).

As image processing is known in the art, the person of skill in the art can select computer routines and code from libraries. For example, for separating 620, the computer system can use face recognition techniques known from hand-held consumer cameras, in the sense to recognize the presences of a face on the image, not in the sense of detecting the person with that face. While the mentioned cameras usually frame faces by rectangles (on the viewer screen of the camera), there is no need to show such frames or the like to a user. There is no user-interaction needed at this stage.

Recognizing faces is known in the art from a number of publications, among them the following:

Qin Zhou, Heng Fan, Hang Su, Hua Yang, Shibao Zheng, Haibin Ling: "Weighted Bilinear Coding over Salient Body Parts for Person Re-identification" in Pattern Recognition Letters, preprint "arXiv:1807.00975", Cornell University 2018, explains re-identification of humans.

Allyson Rice, P. Jonathon Phillips, Vaidehi Natu, Xiaobo An, and Alice J. O'Toole: "Unaware Person Recognition From the Body When Face Identification Fails", Psychological Science 24 (11) 2235-2243, gives guidance how persons can be recognized when face identification fails.

It can be expected that operators 201 wear helmets such as industrial safety helmets (cf. DIN EN 397:2013-04). As helmets might cover some parts of the face, in addition to processing the image of the face, it is possible to process the image in view of further biometric features, such as shoulders and/or body height.

It is noted that once the ID areas with the biometric data have been identified (cf. 701*x*, 702*x* in FIGS. 4-5), the other areas with the activities can be identified as well, simply by subtracting (activity area=image minus ID-area). There is no need to provide particular processing to identify particular activities.

To ensure that images 701, 702 are taken at subsequent points in time, time-stamps can be added. In other words, receiving 610 can comprise to receive series 700 of images 701, 702 with time-stamps of images 701, 702. In principle there are two options.

In embodiments, the time-stamps are added by the cameras (provided that the cameras have synchronized clocks).

It is also possible to add the time-stamps when the audit system receives the images.

Signal propagation delays between the cameras and the audit system can be neglected as the subsequent activities are performed by human operators within intervals (from the first to the second activities) that are larger (i.e., longer) than the signal propagation time (from the camera to the system). Time-stamps for images are known in the art. They can be embedded into the image (graphically) and can be communicated as meta-data.

The activities are industrial activities with the properties that (i) they are repeated frequently and (ii) they are standardized. To stay with the above-explained examples, when putting on gloves (activity 210, on image 701), the operator moves his/her hands in proximity of the glove dispenser, but would not move much the head. When adding ingredients (activity 220, on image 702), the operator moves the hands (more than the feet) and potentially looks into the reactor-tank. In both cases, the looking-direction is more or less predefined for most of the activities (i.e. looking into the direction of the dispenser, looking into the reactor). The cameras—when positioned—have the ID areas on the images more or less the same for all images (in repetitions).

A dynamic approach can be implemented to differentiate areas 701*x*, 702*x* and 701*y*, 702*y*, taking into account that different pixel changes over time differently. For example, as the operator (in the facility) performs the activities, he or she will move the hands more than the feet (for example). It should be sufficient to calculate the differences (e.g., between images taken between fractions of seconds) and to identify potential areas.

It is noted that autofocusing techniques (known from digital cameras) can be used here as well.

Calibrating Biometric Data

As mentioned, in step obtaining identifiers, images for operators 201 from a particular set of operators are taken as reference. The particular set of operators 201 can be defined by a variety of circumstances, such as: the operators working in the facility, the operators working in the facility during particular shifts, the operators working in the facility with particular equipment (e.g., the operators of a tank reactor being different from the operators or drivers of a vehicle). Because the appearance of the operators change from time to time (e.g., different hairdos at different days; moustaches styles), the images can be taken at appropriate points in time (e.g., on a regular basis).

Non-Biometric Image Data Treated Like Biometric Image Data

The operators may carry names on tags, badges, embroidery on the clothing and so on. The name is usually written in a color that sharply contrasts to that of the clothing (e.g., black on white). This allows co-worker to get acquainted with each other.

Optical character recognition techniques (OCR) allow computers to convert image with letters into data. It is contemplated to use such OCR-readings as well to obtain (step 630) the identifiers (e.g., ALPHA, BETA). Areas on the images with the names are to be treated like areas with biometric image data (i.e., ID areas), and removing (step 640) is possible as well. This approach might be even mandatory, because the name (of the operator) is personal data (as explained above) and to be shielded from the evaluator. It is noted that OCR-processing the names helps to distinguish operators with similar appearance (such as identical twins in extreme cases).

Evaluation Computer

FIG. 1B also illustrates evaluation system 800. This computer system can serve as the user interface for evaluator 203. As explained above, the identifiers (ALPHA, BETA) can be embedded into (modified) images 701', 702', the same approach is applicable for parameters 351, 353 (cf. FIGS. 8A, 8C). Image viewing software is commonly available on computers. There is also the expectation that computer file formats that allow image storing (*.jpg, *.bmp, *.tiff, *.pdf, *.png) will still be available within the next decades, corresponding to potential requirements for archiving the records.

Audit system 400 can push audit records 500 to evaluation system 800 as soon as they become available. Notifying the evaluators that records become available is possible (by techniques, such as email, short-message-service SMS, instant messaging such as WHATSAPP™ and others).

Although evaluation system 800 is illustrated as a single computer, audit system 400 can send audit records to different computers depending on the batches or depending on other circumstances.

It is possible to communicatively couple systems 400 and 800 via internet techniques, with/without access techniques through websites, web-portals, relationship management system, database systems, and so on.

Audit records 400 can be enhanced by process documentation (e.g., of the process being performed at the time of receiving the images) and/or by a documentations that indicate details of the facility (e.g., a map or plan of the facility). Such further documentation may assist the evaluator.

Other Usage Scenario

For example, a standard may require transport equipment (e.g., a forklift that moves the bags) to move below a speed limit (e.g., 10 km/h). However, shortly running over the limit (e.g., 12 km/h for 2 seconds) might be allowed. By taking time-stamped images 701 and 702 at two different locations (with known distance), the average speed can be calculated.

Location-Stamp

There could be a requirement that operators have to perform certain activities within pre-defined locations. For example, a bag of flour that has been opened should be emptied into a tank-reactor in proximity but not be carried through the facility. To make the evaluation as easy as possible, the images can optionally be associated with locations within the facility, at pre-defined granularities (e.g., identifying particular equipment, particular rooms within the facility, particular coordinates, particular production line etc.). In other words, the images could be location-stamped.

Computer System in General

Embodiments of the invention can be implemented in digital electronic circuitry, or in computer hardware, firmware, software, or in combinations of them. The invention can be implemented as a computer program product, for example, a computer program tangibly embodied in an information carrier, for example, in a machine-readable storage device, for execution by, or to control the operation of, data processing apparatus, for example, a programmable processor, a computer, or multiple computers. A computer program as claimed can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network. The described methods can all be executed by corresponding computer products on the respective devices, for example, the first and second computers, the trusted computers and the communication means.

Method steps of the invention can be performed by one or more programmable processors executing a computer program to perform functions of the invention by operating on input data and generating output. Method steps can also be performed by, and apparatus of the invention can be implemented as, special purpose logic circuitry, for example, a field programmable gate array (FPGA) or an application-specific integrated circuit (ASIC).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, for example, magnetic, magneto-optical disks, optical disks or solid state disks. Such storage means may also provisioned on demand and be accessible through the Internet (e.g., Cloud Computing). Information carriers suitable for embodying computer program instructions and data include all forms of non-volatile memory, including by way of example semiconductor memory devices, for example, EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, for example, a cathode ray tube (CRT) or liquid crystal display (LCD) monitor, for displaying information to the user and an input device such as a keyboard, touchscreen or touchpad, a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input.

The invention can be implemented in a computing system that includes a back-end component, for example, as a data server, or that includes a middleware component, for example, an application server, or that includes a front-end component, for example, a client computer having a graphical user interface or a Web browser through which a user can interact with an implementation of the invention, or any combination of such back-end, middleware, or front-end components. Client computers can also be mobile devices, such as smartphones, tablet PCs or any other handheld or wearable computing device. The components of the system can be interconnected by any form or medium of digital data communication, for example, a communication network. Examples of communication networks include a local area network (LAN) and a wide area network (WAN), for example, the Internet or wireless LAN or telecommunication networks.

The computing system can include clients and servers. A client and a server are generally remote from each other and typically interact through a communication network. The relationship of client and server arises by virtue of computer programs running on the respective computers and having a client-server relationship to each other.

REFERENCES

100 facility
200 humans
201 operator (A . . . Z)
202 auditor
203 evaluator
300 equipment
301 piece of equipment (A . . . Z)
310 camera (-1, -2)
399 gloves
400 audit system
402 audit report
410 shop floor system
450 standard
600 method
**6*x*0** method steps
700 series of images
701, 702 images (-x, -xx, -y, etc.)
800 evaluation system
Tr1 . . . Tr5 trigger

The invention claimed is:

1. A computer-implemented method (600) for providing an audit record (500) that relates to activities (210, 220) performed by human operators (201) within a manufacturing facility (100) in interaction with technical equipment (300), wherein the audit record (500) indicates performance of an activity sequence (210, 220) with a first activity (210) and with a subsequent second activity (220) by either the same human operator (20 IA) or by different human operators (201 A, 201 Z), the method (600) comprising:

receiving (610), by executing on image data remaining within random access memory (RAM) of a computer processor as long as a first area (701*x*) of a first image (701), and a first area (702*x*) of a second image (702) are not yet removed, a series (700) of images (701, 702) that visualize activities (210, 220) by one or more human operators from a set of human operators (201), the series (700) with at least the first image (701) of a first activity (210) in interaction with first technical equipment (301A), and the second image (702) of a second activity (220) in interaction with second technical equipment (301B, 301C);

by applying facial detection image-processing to the first image (701) and to the second image (702), detecting facial regions within the first image (701) and within the second image (702);

by applying image-processing to the detected facial regions, separating (620), by executing on the image data remaining within the RAM of the computer processor as long as the first area (701*x*) of the first image (701), and the first area (702*x*) of the second image (702) are not yet removed, within the first image (701) and within the second image (702), at least the first (701*x*, 702*x*) areas, a second area (701*y*) of the first image (701), and a second area (702*y*) of the second image (702), wherein the first areas (701*x*, 702*x*) comprise biometric image data indicative of a particular human operator (201A) within the set of human operators (201) belonging to the manufacturing facility (100), and wherein the second areas (70702*y*) comprise image data indicating the interaction with the technical equipment (301A, 301B, 301C);

by applying facial recognition image-processing to the first area (701*x*) of the first image (701) and to the first area (702*x*) of the second image (702), obtaining (630), by executing on the image data remaining within the RAM of the computer processor as long as the first area (701*x*) of the first image (701), and the first area (702*x*) of the second image (702) are not yet removed, identifiers (ALPHA, BETA) of human operators (201) among the multiple human operators by comparing the detected facial regions to reference images of operators from a predefined set of operators, the identifiers (ALPHA, BETA) thereby indicating performance of the first activity and of the second activity by particular human operators (ALPHA, BETA);

by applying image-processing to the first area (701*x*) of the first image (701) and to the first area (702*x*) of the second image (702), removing (640), by executing on the image data remaining within the RAM of the computer processor as long as the first area (701*x*) of the first image (701), and the first area (702*x*) of the second image (702) are not yet removed, biometric image data indicative of particular human operators (ALPHA) from the first area (701*x*) of the first image (701) and from the first area (702*x*) of the second image (702) by switching pixels of the first areas to a single color, so that the first area (701 x) of the first image (701) is modified to a modified first area (70 lxx) of the first image (701) and the first area (702*x*) of the second image (702) is modified to a modified first area (702*xx*) of the second image (702);

combining (650), by executing in non-volatile storage, the modified first area (701*xx*) of the first image (700) with the second area (701*y*) of the first image (701) to a modified first image (701'), and combining the modified first area (702*xx*) of the second image (702) with the second area (702*y*) of the second image (702) to a modified second image (702'); and providing (660) the audit record (500) by storing the modified first image (701'), the modified second image (702') with the respective identifiers (ALPHA, BETA).

2. The method (600) according to claim 1, wherein receiving (610) comprises to receive the series (700) of images (701, 702) with time-stamps of the images (701, 702).

3. The method (600) according to claim 1, wherein receiving (610) comprises to receive the series (700) of images (701, 702) with receiving the first image (701) from a first camera (310-1) and with receiving the second image (702) from a second camera (310-2), wherein the first and the second cameras are associated with first technical equipment and with second technical equipment (301A, 301B/C), respectively.

4. The method (600) according to claim 1, wherein receiving (610) comprises to receive technical parameters (351, 352, 353) that relate to the technical equipment (300, 301A, 301B/C) wherein the technical parameters are associated with the images as being part of the images or as being received in a meta-data attachment (702-DATA) to the images.

5. The method (600) according to claim 4, wherein receiving (610) comprises to receive technical parameters (351, 352, 353) that relate to the technical equipment from an equipment interface, wherein the technical parameters are being related to either the first image (701) or to the second image (702).

6. The method (600) according to claim 1, wherein receiving (610) the series (700) of images (701, 702) is triggered for particular images by a production management system (410) that provides the identification of a particular batch so that as a result of providing the audit record (500), the audit record (500 #1, 500 #2) is related to the particular batch.

7. The method (600) according to claim 6, wherein receiving (610) the series (700) of images is triggered by the production management system that provides the identification of a first batch (#1) and of a second batch (#2), wherein receiving the first image (701) of the first activity (210) is related to both batches (#1, #2), wherein receiving the second image (702) of the second activity (220) is performed in batch specific versions, for a second image of the first batch and a second image of the second batch, so that providing the audit records comprises to provide separate audit records for the first batch and for the second batch.

8. The method (600) according to claim 1, wherein the biometric image data comprises data relating to the face of the human operators.

9. The method (600) according to claim 8, wherein the biometric image data comprises data relating to the face of the human operators, and wherein in step obtaining (630) identifiers, images for the operators (201) from a particular set of operators are taken as reference.

10. One or more non-transitory, computer-readable mediums, the one or more non-transitory, computer-readable mediums having stored thereon computer-executable instructions that, when executed by at least one processor, causes the at least one processor to:

receive (610), by executing on image data remaining within random access memory (RAM) of a computer processor as long as a first area (701*x*) of a first image (701), and a first area (702*x*) of a second image (702) are not yet removed, a series (700) of images (701, 702) that visualize activities (210, 220) by one or more human operators from a set of human operators (201), the series (700) with at least the first image (701) of a first activity (210) in interaction with first technical equipment (301A), and the second image (702) of a second activity (220) in interaction with second technical equipment (301B, 301C);

by applying facial detection image-processing to the first image (701) and to the second image (702), detect facial regions within the first image (701) and within the second image (702);

by applying image-processing to the detected facial regions, separate (620), by executing on the image data remaining within the RAM of the computer processor as long as the first area (701*x*) of the first image (701), and the first area (702*x*) of the second image (702) are not yet removed, within the first image (701) and within the second image (702), at least the first (701*x*, 702*x*) areas, a second area (701*y*) of the first image (701), and a second area (701*y*, 702*y*) of the second image (702), wherein the first areas (701*x*, 702*x*) comprise biometric image data indicative of a particular human operator (201A) within the set of human operators (201) belonging to a manufacturing facility (100), and wherein the second areas (701 y, 702*y*) comprise image data indicating the interaction with the technical equipment (301A, 301B, 301C);

by applying facial recognition image-processing to the first area (701*x*) of the first image (701) and to the first area (702*x*) of the second image (702), obtain (630), by executing on the image data remaining within the RAM of the computer processor as long as the first area (701*x*) of the first image (701), and the first area (702*x*) of the second image (702) are not yet removed, identifiers (ALPHA, BETA) of human operators (201) among the multiple human operators by comparing the detected facial regions to reference images of operators from a predefined set of operators, the identifiers (ALPHA, BETA) thereby indicating performance of the first activity and of the second activity by particular human operators (ALPHA, BETA);

by applying image-processing to the first area (701*x*) of the first image (701) and to the first area (702*x*) of the second image (702), remove (640), by executing on the image data remaining within the RAM of the computer processor as long as the first area (701*x*) of the first image (701), and the first area (702*x*) of the second image (702) are not yet removed, biometric image data indicative of particular human operators (ALPHA) from the first area (70 1*x*) of the first image (701) and from the first area (702*x*) of the second image (702) by switching pixels of the first areas to a single color, so that the first area (70 1*x*) of the first image (701) is modified to a modified first area (701*xx*) of the first image (701) and the first area (702*x*) of the second image (702) is modified to a modified first area (702*xx*) of the second image (702);

combine (650), by executing in non-volatile storage, the modified first area (701*xx*) of the first image (700) with the second area (701*y*) of the first image (701) to a modified first image (701'), and combine the modified first area (702*xx*) of the second image (702) with the second area (702*y*) of the second image (702) to a modified second image (702'); and provide (660) an audit record (500) by storing the modified first image (70 1'), the modified second image (702') with the respective identifiers (ALPHA, BETA).

11. An audit computer system (400), comprising one or more processors configured to:

receive (610), by executing on image data remaining within random access memory (RAM) of a computer processor as long as a first area (701*x*) of a first image (701), and a first area (702*x*) of a second image (702) are not yet removed, a series (700) of images (701, 702) that visualize activities (210, 220) by one or more human operators from a set of human operators (201), the series (700) with at least the first image (701) of a first activity (210) in interaction with first technical equipment (301A), and the second image (702) of a second activity (220) in interaction with second technical equipment (301B, 301C);

by applying facial detection image-processing to the first image (701) and to the second image (702), detect facial regions within the first image (701) and within the second image (702);

by applying image-processing to the detected facial regions, separate (620), by executing on the image data remaining within the RAM of the computer processor as long as the first area (701*x*) of the first image (701), and the first area (702*x*) of the second image (702) are not yet removed, within the first image (701) and within the second image (702), at least the first (701*x*, 702*x*) areas, a second area (701*y*) of the first image (701), and a second area (701*y*, 702*y*) of the second image (702), wherein the first areas (701*x*, 702*x*) comprise biometric image data indicative of a particular human operator (201A) within the set of human operators (201) belonging to a manufacturing facility (100), and wherein the second areas (701*y*, 702*y*) comprise image data indicating the interaction with the technical equipment (301A, 301B, 301C);

by applying facial recognition image-processing to the first area (701*x*) of the first image (701) and to the first area (702*x*) of the second image (702), obtain (630), by executing on the image data remaining within the RAM of the computer processor as long as the first area (701*x*) of the first image (701), and the first area (702*x*) of the second image (702) are not yet removed, identifiers (ALPHA, BETA) of human operators (201) among the multiple human operators by comparing the detected facial regions to reference images of operators from a predefined set of operators, the identifiers (ALPHA, BETA) thereby indicating performance of the first activity and of the second activity by particular human operators (ALPHA, BETA);

by applying image-processing to the first area (701 x) of the first image (701) and to the first area (702*x*) of the second image (702), remove (640), by executing on the image data remaining within the RAM of the computer processor as long as the first area (701*x*) of the first image (701), and the first area (702*x*) of the second image (702) are not yet removed, biometric image data indicative of particular human operators (ALPHA) from the first area (701*x*) of the first image (701) and from the first area (702*x*) of the second image (702) by switching pixels of the first areas to a single color, so that the first area (701*x*) of the first image (701) is modified to a modified first area (701*xx*) of the first image (701) and the first area (702*x*) of the second image (702) is modified to a modified first area (702*xx*) of the second image (702);

combine (650), by executing in non-volatile storage, the modified first area (701*xx*) of the first image (700) with the second area (701*y*) of the first image (701) to a modified first image (701'), and combine the modified first area (702*xx*) of the second image (702) with the second area (702*y*) of the second image (702) to a modified second image (702'); and provide (660) an audit record (500) by storing the modified first image (701'), the modified second image (702') with the respective identifiers (ALPHA, BETA).

* * * * *